(12) United States Patent
Agrawal et al.

(10) Patent No.: US 6,628,943 B1
(45) Date of Patent: *Sep. 30, 2003

(54) MOBILITY MANAGEMENT UTILIZING ACTIVE ADDRESS PROPAGATION

(75) Inventors: Prathima Agrawal, New Providence, NJ (US); Jyh-Cheng Chen, Flanders, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/512,645

(22) Filed: Feb. 24, 2000

Related U.S. Application Data

(60) Provisional application No. 60/121,552, filed on Feb. 15, 1999.

(51) Int. Cl.⁷ .................................................. H04Q 7/20
(52) U.S. Cl. ..................... 455/432.1; 455/436; 455/442; 455/445; 370/338
(58) Field of Search ................................. 455/432, 436, 455/438, 442, 445, 446, 517, 418, 422; 370/338, 475; 709/245

(56) References Cited

U.S. PATENT DOCUMENTS

| | | | | |
|---|---|---|---|---|
| 5,875,183 | A | | 2/1999 | Nitadori ..................... 370/328 |
| 5,930,714 | A | | 7/1999 | Abu-Amara et al. ........ 370/331 |
| 5,949,780 | A | | 9/1999 | Gopinath ..................... 370/389 |
| 5,987,011 | A | | 11/1999 | Toh ............................ 370/331 |
| 6,014,569 | A | | 1/2000 | Bottum ....................... 455/466 |
| 6,041,358 | A | | 3/2000 | Huang et al. ............... 370/331 |
| 6,122,665 | A | | 9/2000 | Bar et al. .................. 379/88.17 |
| 6,161,008 | A | * | 12/2000 | Lee et al. .................. 455/414 |
| 6,185,288 | B1 | | 2/2001 | Wong ......................... 370/352 |
| 6,195,705 | B1 | * | 2/2001 | Leung ......................... 709/245 |
| 6,421,714 | B1 | * | 7/2002 | Rai et al. .................... 709/217 |
| 6,434,134 | B1 | * | 8/2002 | La Porta et al. ............ 370/338 |
| 6,473,411 | B1 | * | 10/2002 | Kumaki et al. ............. 370/331 |
| 6,490,259 | B1 | * | 12/2002 | Agrawal et al. ............ 370/331 |
| 6,496,704 | B2 | | 12/2002 | Yuan .......................... 370/338 |

OTHER PUBLICATIONS

"Fast and Scalable Wirless Handoffs in Support of Mobile Internet Audio", R. Caceres and V.N. Padmanabhan; Mobil Networks and Applications 3 (1998) pp. 351–363.

"A Cellular IP Testbed Demonstrator", A.T. Campbell, J. Gomez, S. Kim, B. Paul, T. Sawada, C–Y. Wan, A.G. Valko, Turanyi; IEEE, 0–7803–590 4–6/99 1999, pp. 145–148.

"IP Mobility Support", Memo to Network Working Group, Standards Track Category, from C. Perkins, Editor, IBM Oct. 1996; 79 pages.

* cited by examiner

*Primary Examiner*—Edward F. Urban
*Assistant Examiner*—Simon Nguyen
(74) *Attorney, Agent, or Firm*—Joseph Giordano; James W. Falk

(57) ABSTRACT

Active packets are utilized by a mobile terminal in a wireless network to set-up a wireless call via a signaling process, and for mobility management via a mobility process as the mobile terminal moves from one cell to another in a subnet. Active packets instantiate an agent in the fixed network to handle signaling between the mobile terminal and the fixed network, and then instruct the agent to negotiate setup of an open channel between the mobile terminal and the destination device. Moreover, active packets foster the handoff of the mobile terminal as the terminal moves from one cell to another in a subnet. Finally, the signaling process and mobility process are coordinated so that lost active packets are mitigated during roaming by the mobile terminal.

5 Claims, 21 Drawing Sheets

MOBILITY MANAGEMENT UTILIZING ACTIVE ADDRESS PROPAGATION

CROSS-REFERENCE TO RELATED APPLICATION

This application is a non-provisional application of provisional application Serial No. 60/121,552, filed Feb. 15, 1999. It is also related to Agrawal-Chen applications Ser. No. 09/512,514 (now U.S. Pat. No. 6,490,259, Dec. 3, 2002), Ser. Nos. 09/512,644, and 09/512,646, all filed Feb. 24, 2000.

BACKGROUND OF THE DISCLOSURE

1. Field of the Invention

This invention relates generally to packet telephony communications, and, more particularly, to methodologies and concomitant circuitry for applying active networking to existing call signaling, call setup, and mobility management.

2. Description of the Background

The Internet is expected to see continued growth in supporting personal and commercial services. Currently IP telephony provides voice service to end terminals that are attached to wired networks. With the proliferation of mobile and wireless services and as more users disconnect from their fixed access points and become mobile, there is an increasing need to adapt Voice-over-Internet Protocol (VoIP) to the wireless domain.

However, the wireless environment is dynamic in nature due to the mobility of the end terminals and the variability of the over-the-air channel. Moreover, the mobile wireless environment is much more dynamic than the traditional wireline environment. The uncertainties of the wireless and mobile environments call for an increased level of adaptability. For more robust real-time communications, a signaling protocol is vital in providing highly reliable and robust connectivity in such a communications environment. In addition to establishing and releasing a call, a signaling protocol must also monitor and maintain connectivity when the end-terminal is moving and/or the transmission capabilities are varying. Successful installation of VoIP across network elements with differing capabilities and over a dynamic wireless channel requires signaling protocols to have flexible and self-adaptive functionality.

Moreover, besides signaling, it is necessary to provide for the "mobility" of a wireless terminal as it moves from one serving cell to another serving cell during an established call. Finally, in order to provide complete service to the wireless terminal, it is necessary to further combine the operations fostered by signaling and mobility so as to ensure setup and connectivity of a wireless terminal as it moves from one serving cell to another during a call setup.

Active networks are a class of networks that can be leveraged to provide this adaptability. An active network allows intermediate nodes to perform computations specified by packets or modify in-transit packets. This technique allows programs to be executed or structures to be reconfigured in the network based on programs and/or data contained in the packets traversing the network. Thus, this technique injects a degree of intelligence and flexibility into current network elements that can be configured and programmed to suit a variety of needs. Moreover, this type of processing can be customized on a per-user or per-application basis.

A recent disclosure relating to active networks is the subject matter of U.S. Pat. No. 5,949,780 issued to Gopinath. The subject matter of this patent relates to methodologies and concomitant circuitry for coalescing intelligence with communications in a switching node. The inventive aspects of '780 suggestions related to program execution in the switch based upon the following actions/events (an event triggers an action which, in turn, generates a desired response): the state of the program itself, the state of resources composing the switch; external control inputs serving the switch; other programs executing in the switch; data (packets) received over other ports of the switch; or combinations of these actions/events. In addition, the inventive aspects covered an implementation in conjunction with a switch wherein a new program may be downloaded to the switch, and then this new program may be executed, together with other stored programs if necessary, based upon data incoming to a port as well as any or all the foregoing actions/events.

In accordance with the broad method aspect of '780, a communications service is implemented with a program stored in a processing unit having input and output ports to receive and transmit messages—each message is composed of canonically, a control tag and payload information. For each port, data is retrieved and then parsed by the program to determine if the control tag and/or the payload information are to be modified. Based upon the parsing, the incoming message can be sent to one or more other ports, or further processed by the program or other stored programs to produce desired actions.

As alluded to above, mobility management is important in the wireless environment, and currently mobility in the Internet is supported by the Mobile IP protocol. Mobile IP identifies a mobile node (e.g., a mobile terminal) by its permanent home address, regardless of its current point of attachment in the Internet. While away from its home network, the mobile node acquires a "care-of address" that reflects its current point of attachment. By default, Mobile IP uses an agent in the home network to redirect (by encapsulation) packets destined for the home address to the care-of address. This redirection causes Mobile IP to be inefficient (triangular routing) and not robust (relies on a home agent and sometimes on a foreign agent). Mobility support in IPv6 has moved in the direction of end-to-end location updates using the facilities of IPv6 to send binding updates. In addition to sending its binding to its home agent, a mobile terminal can send the binding to the corresponding node communicating with it. When sending a packet, the corresponding node checks it's binding for the destination address. The packet is then sent directly to the care-of address without going through the home agent if the binding is found. This improves routing efficiency. However, it still requires communications via the home agent when the corresponding node does not know the current location of the mobile, or when both nodes can be mobile simultaneously, or if the mobile wants to hide its location.

The prior art is devoid of teachings or suggestions relating to: generating an active packet in a mobile terminal to provide information for instantiating an agent in the fixed network to handle signaling between the mobile terminal and the fixed network, and then instantiating the agent in the fixed network to negotiate setup of an open channel between the mobile terminal and the destination device. The instantiation of the agent mitigates use of bandwidth between the mobile terminal and the fixed network.

Moreover, the art is devoid of teachings or suggestions relating to generating an active packet to foster the handoff of a mobile terminal as the terminal moves from one cell to another in a subnet.

Finally, there are no teachings or suggestions in the art relating to ensuring completion of the signaling operation as a mobile terminal is handed off from one cell to another in a subnet.

SUMMARY OF THE INVENTION

Shortcomings and limitations of the prior art are obviated, in accordance with the present invention, by a methodology and concomitant circuitry wherein, generally, an active packet transmitted from a mobile terminal initiates execution of a mobility process in the communications network to handle handoff of the mobile terminal as it moves within a subnet.

Broadly, in accordance with one method aspect of the present invention, a method for managing the mobility of a wireless mobile terminal in a subnet of a network, the subnet being served by a plurality of base stations, includes:

(a) transmitting an active packet from the terminal to one of the base stations; and (b) executing a mobility process in the base stations of the subnet in response to the active packet being received by said one of the base stations.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To fully appreciate the import of the adaptive mobility system of the present invention, as well as to gain an appreciation for the underlying operational principles of the present invention, it is instructive to first present, in overview fashion, a high-level description of a conventional system for call setup signaling and control. This overview also serves to introduce terminology so as to facilitate the more detailed description of illustrative embodiments in accordance with the present invention. Following this overview, an elucidation of the illustrative embodiments is then presented.

Overview of a Conventional Signaling System

One standard, referred to as the H.323 standard, has recently emerged for the signaling and control of VoIP; H.323 is widely deployed in existing corporate, government, and commercial networks. For example, NetMeeting, an H.323-compliant product, was released by Microsoft in 1996. However, although the focus of the illustrative embodiments of the present invention is on H.323, it is clear that the description of the illustrative embodiments provide a framework for other standards/protocols as well.

H.323 was originally developed for visual terminal conferencing over non-guaranteed Quality-of-Service (QoS) LANs and is an umbrella standard covering audio and video codecs, call signaling, connection control, data and conference control, media transport, and so forth. In H.323, the signaling functionality is migrated to end terminals that are intelligent end points instead of the "dumb end" points used in the Public Switched Telephone Network (PSTN). H.323 is also not tied to a single transport mechanism, and can run over Asynchronous Transfer Mode (ATM) networks, ISDN, and so forth.

Figure 1:
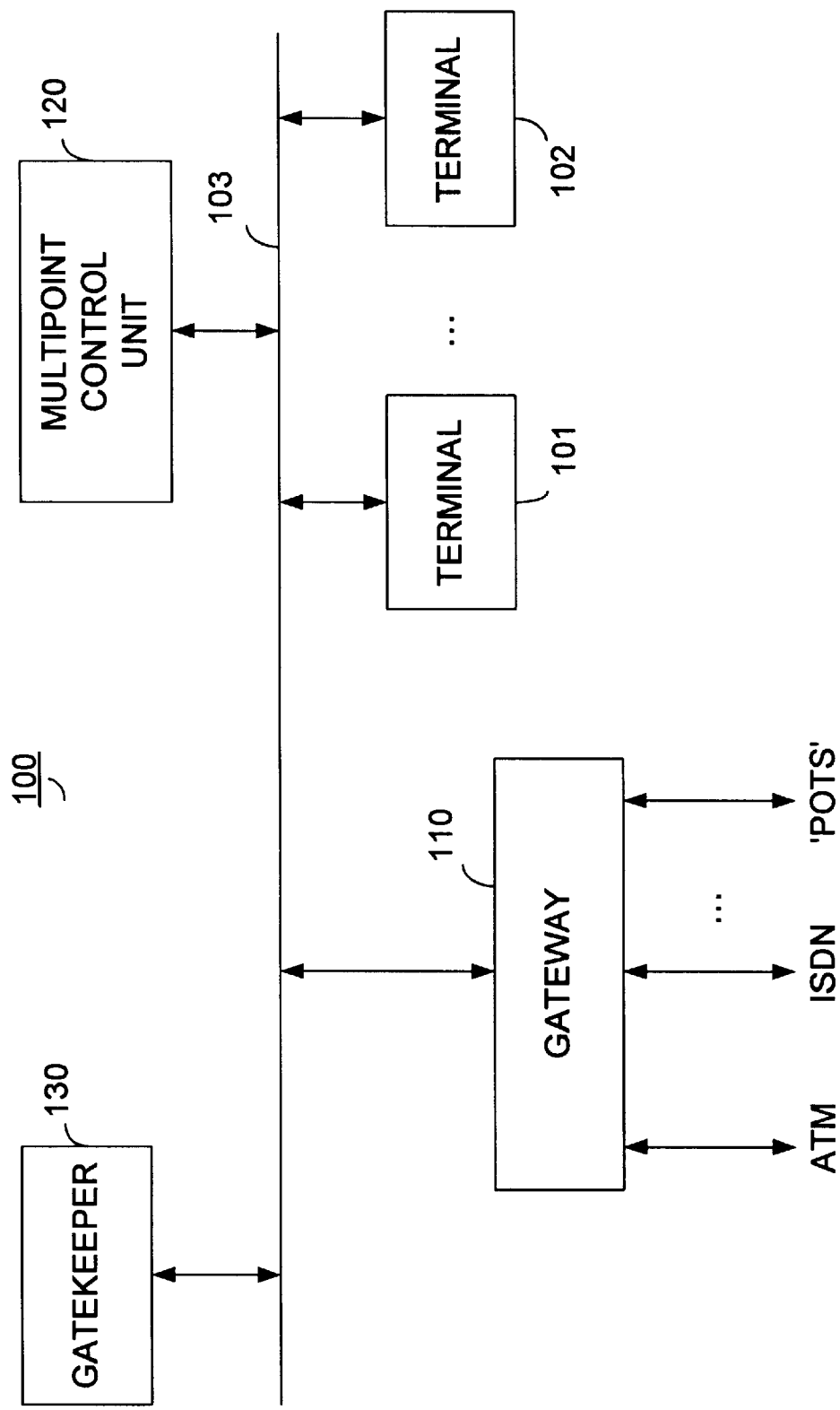
FIG. 1 depicts an illustrative architecture for conventional H.323 zones.

FIG. 1 depicts a typical architecture and components of an H.323 LAN 100 that is called a H.323 "zone". (As alluded to above, the present invention may be embodied in other standards/protocols. In that the term "zone" is somewhat particular to H.323, the generic term "domain" is deployed to connote the generalization of a "zone" to thereby encompass these other standards/protocols). A terminal in H.323, such as terminal 101 or 102, usually is a multimedia PC, but other fixed terminal devices are possible. (Mobile devices, such as a laptop or a PDA (Personal Digital Assistant), are not handled by the conventional H.323 system. Rather, these types of mobile devices fall within the purview of the present invention, as discussed later). All H.323 terminals must support the H.245 standard (discussed in more detail below), which is used to negotiate channel usage and capabilities. Three other protocols/standards are also required for an H.323 zone, namely: (i) the Q.391 standard for call signaling and call setup; (ii) the RAS (registration, admission, status) protocol that is used to communicate with a gatekeeper (discussed shortly); and (iii) support for the RTP/RTCP (Real-time Transport Protocol/RTP Control Protocol) protocol for sequencing audio and video packets. Gateway (GW) 110 is a connection point or endpoint for the network into which zone 100 is embedded that provides for real-time, two-way communications between H.323 terminals on the packet-based network, other terminals on a switched circuit network, and other H.323 gateways. GW 110 interworks with other telecommunications systems such as ISDN, ATM, Plain Old Telephone Service (POTS), and so forth. In addition, to provide a translation function between H.323 endpoints and other terminals on the packet-based network supported by zone 100, GW 110 also provides translations between audio and video codecs and performs call setup and clearing on both the LAN side and the circuit-switched network side. GW 110 is only needed when there are connections to other networks. Multipoint Control Unit (MCU). 120 is an endpoint that provides the capability for three or more terminals and gateways to participate in a multipoint conference. It may also connect two terminals in a point-to-point conference that may later develop into a multipoint conference. MCU 120 may be brought into a conference by gatekeeper (GK) 130 without being explicitly called by one of the endpoints. MCU 120 is composed of a Multipoint Controller (MC) (not explicitly shown), and in some configurations, a Multipoint Processor (MP) (not explicitly shown). The Multipoint Controller handles H.245 negotiations between all terminals to determine capabilities for audio and video processing. The Multipoint Processor deals directly with media streams to process, switch, and mix the audio and video streams and/or data bits. Gatekeeper 130 is an entity that provides address translation (from LAN aliases for terminals and gateways to IP addresses) and controls access to the network for H.323 terminals, gateways, and MCUs. Gatekeeper 130 may also provide other services to the terminals, gateways and MCUs such as bandwidth management and locating other gateways. GK 130 acts as the central point for all calls within its zone and provides call control services to registered endpoints. Components 101, 102, 110, 120, and 130 are interconnected via path 103 (e.g., an Ethernet).

H.323 uses H.225.0 as the connection establishment protocol and H.245 as the control protocol between H.323 clients to establish a call, negotiate terminal capability and open logical channels. In H.225.0, the RAS protocol is used for terminal-to-gatekeeper signaling. For example, a terminal uses RAS to discover a gatekeeper, register, and then keep the connection alive by periodic information exchange. If a gatekeeper is present, RAS is used for pre-call setup as well. A terminal must obtain permission from the gatekeeper to make/accept a call, and then obtains the called party's Q.931 address for call setup. Q.931 is then used for call setup and tear down. Finally, H.245 is used for capability exchange (audio/video codec), master/slave determination, and open/close of logical channels. To reiterate, in H.225.0: RAS is used for registration and pre-call setup with a gatekeeper; Q.931 is used for call setup and tear down; and H.245 is used for capability exchange.

Figure 2:
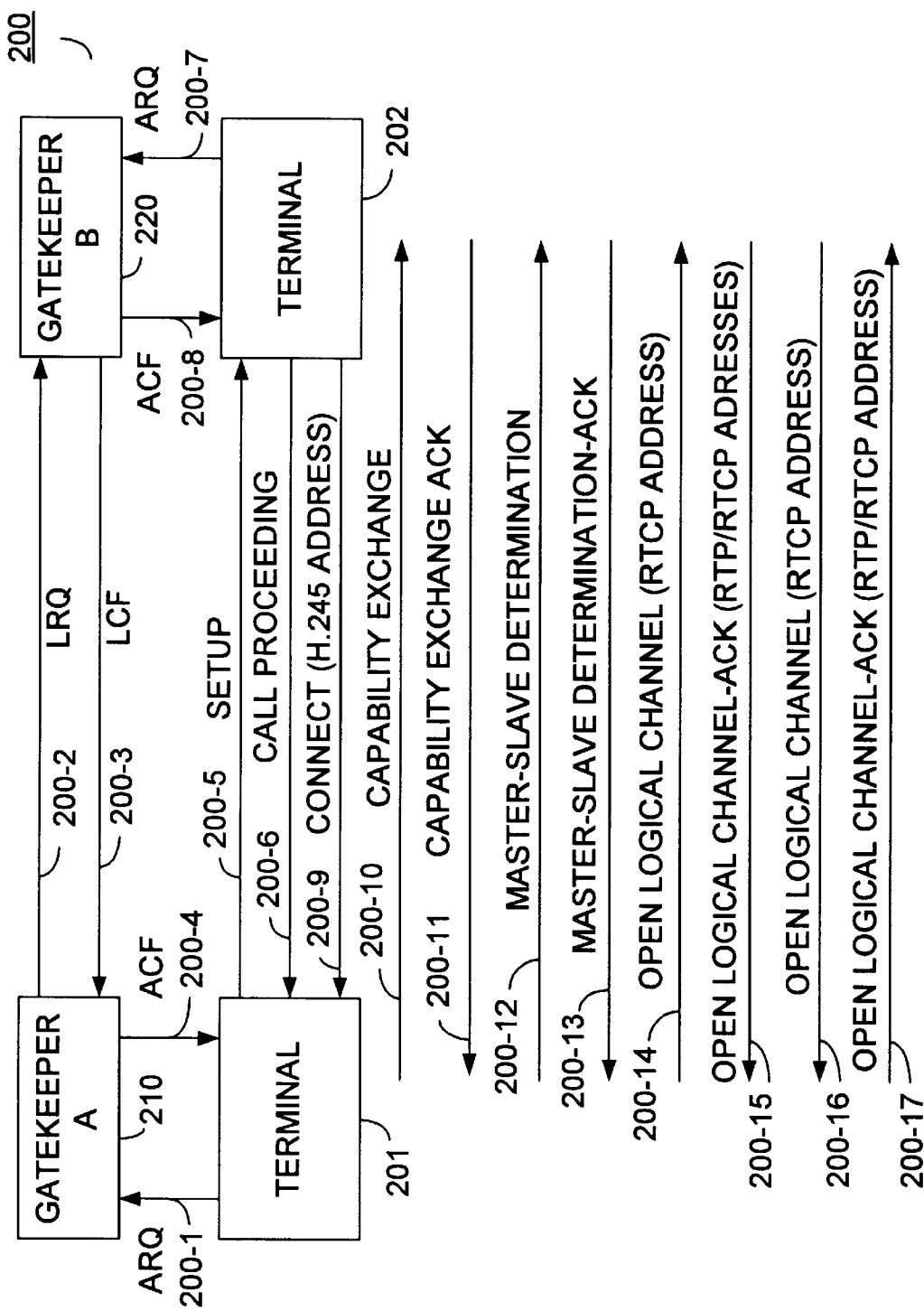
FIG. 2 is a flow diagram for the signaling steps to setup a call between the two H.323 zones.

FIG. 2 depicts a typical signaling example, with concomitant signaling steps, involving two gatekeepers 210 and 220 (GK A and GK B, respectively); for exemplary purposes, GK A is located in one zone, whereas GK B resides in another zone. It is presumed that all terminals have registered with their corresponding gatekeepers; therefore, the RAS procedure has already been effected and the RAS steps are not explicitly shown since registration is not the focus of the present invention. With respect to the pre-call setup aspect of RAS, FIG. 2 depicts steps 200-1 through 200-4, 200-7, and 200-8 as steps in the H.225.0 RAS protocol for such setup. A terminal in the first zone, such as terminal 201, that wants to setup a call first sends a RAS request to GK A; this request is an admission request (ARQ) and is denoted as step 200-1. This ARQ message is sent as a packet from terminal 201 to GK A. In that the ARQ message is meant for GK A, the standard protocol stack processing embeds the ARQ packet with sufficient information for detection and processing by GK A instead of the other devices on the zone, such as terminal 102 in FIG. 1. In turn, GK A sends a RAS location request (LRQ), as step 200-2, to GK B. Now, the LRQ message is filled-in with sufficient information so that only GK B receives and processes the LRQ message. GK B responds with a RAS location confirmation (LCF), as step 200-3, to GK A Then GK A sends a RAS admission confirmation (ACF), via step 200-4, to call origination terminal 201 with the address of the desired location, that is, terminal 202, as supplied by the LCF message from GK B to GK A. Terminal 201 initiates a call SETUP request to terminal 202 as step 200-5. Now the standard protocol stack processing configures the SETUP packet with sufficient information so that the packet is delivered directly to terminal 202 from terminal 201. The SETUP message includes terminal 201's address information so that terminal 202 can respond directly to terminal 201. Terminal 202 responds with a CALL PROCEEDING message to terminal 201 via step 200-6. Step 200-7 involves a RAS admission request (ARQ) to GK B, and step 200-8 completes an admission confirmation (ACF) message to terminal 202 from GK B. Terminal 202 is now able to supply terminal 201 with a CONNECT message, including an H.245 address, as step 200-9.

In terms of actual calling parties, denoted the call originator and call receiver, after the message exchanges between the two GKs (steps 200-2 and 200-3), GK A responds to the call originator (caller), that is, terminal 201, with the address (location) of the desired destination (callee), that is, terminal 202. The caller then is able to directly send the SETUP request to the callee via step 200-5. After acknowledging the SETUP request by sending a CALL PROCEEDING message (step 200-6) to the caller, the callee then asks GK B for admission permission via step 200-7. Once the permission is granted by GK B (step 200-8), the callee responds to the caller via the CONNECT message (step 200-9).

In H.323, messages are transmitted in binary representation based on ASN.1 (Abstract Syntax Notation One) which is defined in ITU-T X.680. ASN.1 is a data specification language. The binary encoding of data structures is covered in ITU-T X.691 (PER: Packed Encoding Rules) and ITU-T X.690 (BER: Basic Encoding Rules). After decoding and looking up the ASN.1, the receiver of a message knows what the message is and how to read each field of the packet. To illustrate ASN.1 for an exemplary message in the RAS protocol, the ARQ message is chosen. For expository purposes, Appendix A lists RAS message abbreviations. Also, detailed information about ARQ and ARQ in ASN.1 is shown in Appendix B and C, respectively. Also, for specificity, it is noted that steps 200-5, 200-6, and 200-9 are parts of the H.225.0 Q.931 protocol.

The previous nine steps are carried out via the H.225.0 protocol. The next eight steps (200-10 through 200-17) are carried out under the H.245 protocol, with the purpose of opening a channel between the terminals 201 and 202 so the two terminals may then directly communicate with each other by RTP/RTCP. To open a channel, the series of steps 200-10 through 200-17 carry out "hand-shake" messages between the terminals. In particular, step 200-10 results in a CAPABILITY EXCHANGE message from terminal 201 to terminal 202, such as, video/audio capability. Terminal 202 completes a return CAPABILITY EXCHANGE ACKNOWLEDGEMENT via step 200-11. Next, there is a MASTER-SLAVE DETERMINATION message carried out by step 200-12, and a return MASTER-SLAVE DETERMINATION ACKNOWLEDGE message is effected by step 200-13. Terminal 201 transmits an OPEN LOGICAL CHANNEL message with a RTCP address to terminal 202, via step 200-14, and terminal 202 returns an OPEN LOGICAL CHANNEL ACKNOWLEDGEMENT with both RTP and RTCP addresses via step 200-15 to terminal 201. Finally, terminal 202 transmits its OPEN LOGICAL CHANNEL message with a RTCP address, via step 200-16, to terminal 201, and terminal 201 returns an OPEN LOGICAL CHANNEL ACKNOWLEDGEMENT with both RTP and RTCP addresses via step 200-17 to terminal 202.

1. Signaling Aspect of the Present Invention, Including an Illustrative Embodiment In this section, the signaling defined in H.323 is extended to wireless and/or mobile devices by employing an "active network" overlay on the underlying network. The signaling in H.323 includes H225.0 and H.245 as detailed above. In accordance with the present invention, however, the H.245 protocol is performed by an "agent" on behalf of the wireless/mobile terminals, thereby saving traffic traversed over the wireless links, by utilizing operational principles fostered by "active networks".

Figure 3:
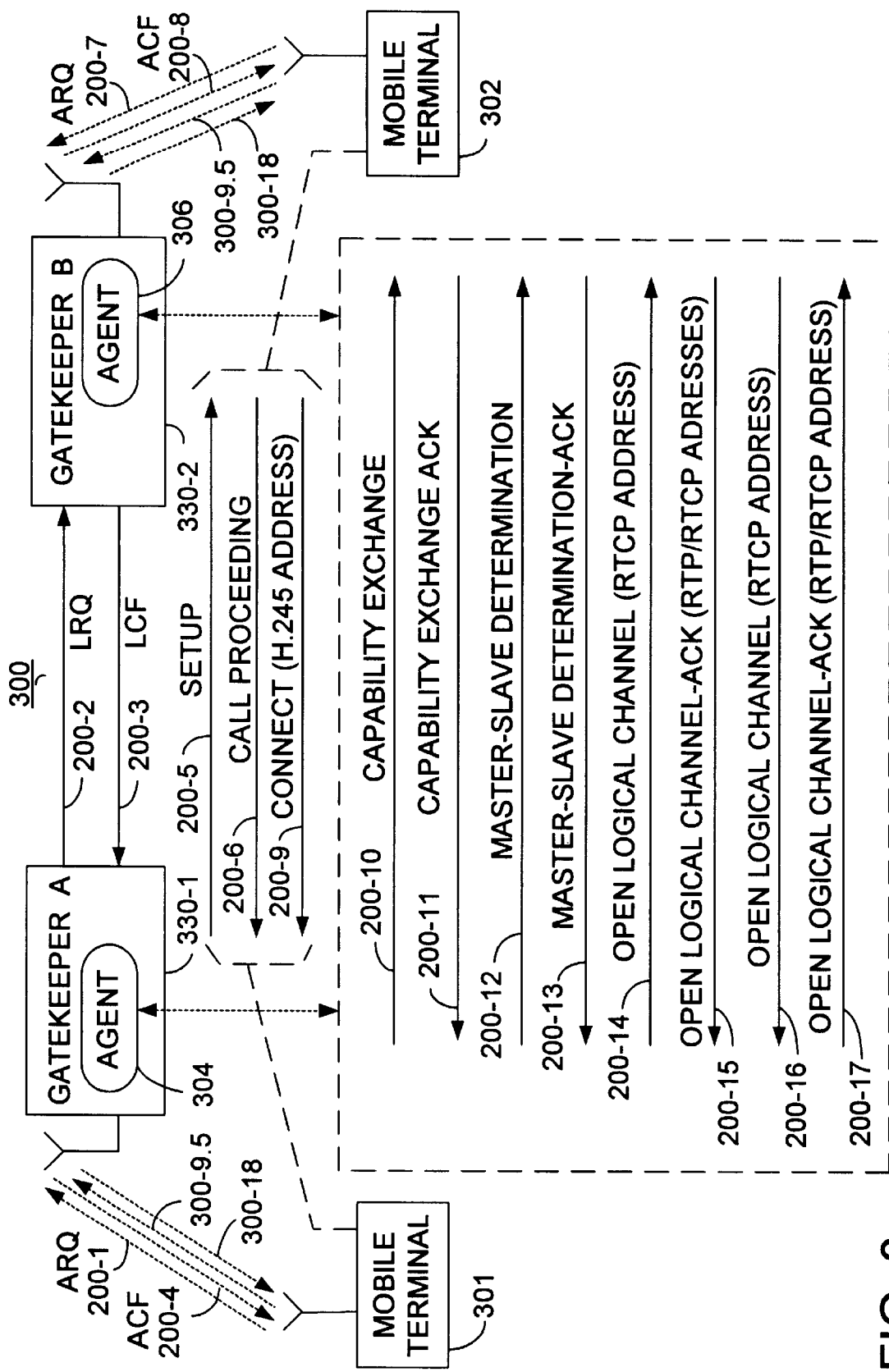
FIG. 3 depicts an illustrative arrangement in accordance with the present invention using the flow diagram of FIG. 2 as a basis.

FIG. 3 illustrates, in pictorial fashion, arrangement 300 for implementing the present invention wherein the additions to FIG. 2 are shown so as to carry out signaling in the illustrative embodiment. Accordingly, to extend the signaling technique to the wireless/mobile domain via active network principles, the caller sends an "active packet" to GK A in the initial step of signaling, that is, step 200-1. For example, to accomplish this signaling, GK A may be configured with the operational capability of a conventional Base Station Controller (BSC) or a Base Station (BS) upon which mobile terminal 301 homes, or GK A may be connected to a conventional BSC/BS (not shown); for the sake of specificity, GK A is presumed to also function as a BSC/BS, and it is identified by reference numeral 330-1.

Figure 4A:
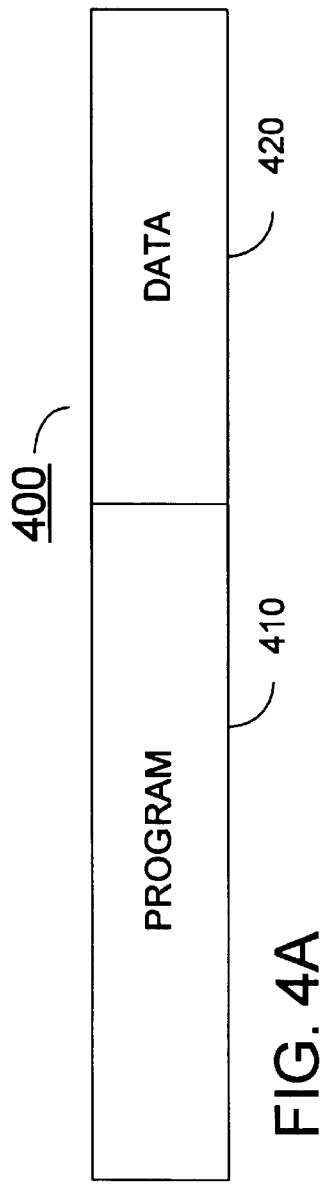
FIG. 4 depicts active packets used during stages of signaling.

An active packet is an information packet, compatible with system 300 of FIG. 3, which contains executable information, control information, and data for processing by one or more nodes in the active network. Generally, an active packet includes a data portion (control information and data) and a program portion (executable information); for instance, active packet 400 as exemplified in FIG. 4A, is composed of data portion 420 and program portion 410.

Figure 4B:
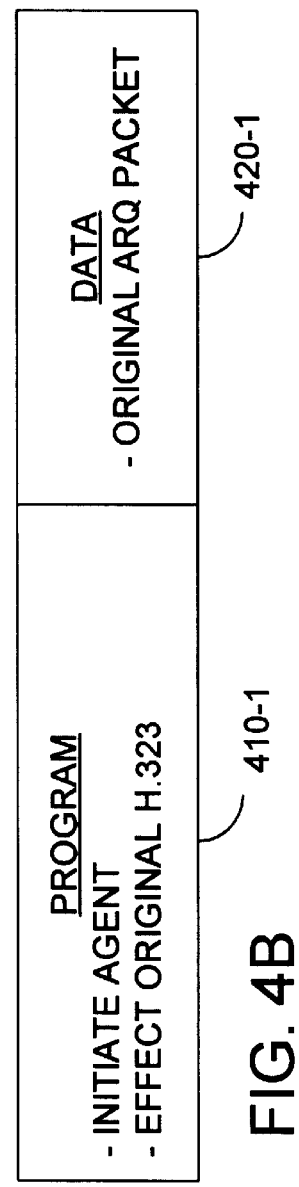

An active packet for carrying out the ARQ step 200-1 of FIG. 3 has the layout depicted in FIG. 4B. Program portion 410-1 instructs GK A to execute certain programs, namely: (i) a program to initiate an 'agent' process, denoted agent 304 in FIG. 3; and (ii) a program to carry out the conventional H.323 protocol. Data portion 420-1 includes the original ARQ packet encoded in BER or PER.

So as to further clarify this illustrative embodiment, it is necessary to distinguish the augmented gatekeepers (330-1 and 330-2) of FIG. 3 of the embodiment from the gatekeeper 130 of FIG. 1 in the original H.323 protocol definition. Focusing on gatekeeper 330-1, it is a node which is programmable by active packets. There is a pre-defined set of programs, residing in GK 330-1, that can be executed in response to active packets. The full set of needed programs is disclosed as the description unfolds; two of the stored programs have already been set forth above, namely, programs referred to in the foregoing paragraph as programs (i)–(ii). Thus, an active packet need not convey actual programs; instead, an active packet carries only instructions to instruct the augmented gatekeeper on what stored programs must be executed. By way of reiterating this view in terms of the discussion to FIG. 4B, program portion 410-1 carries instructions that: initiate in GK 330-1 the corresponding agent (e.g., 304); and initiate the GK 330-1 to handle the ARQ in the conventional fashion with the ARQ as provided in data portion 420-1. When GK 330-1 receives the active packet of step 200-1, the gatekeeper uses its stored programs to instantiate agent 304, and effects the necessary work defined in the original H.323 for the ARQ data in data portion 420-1.

Steps 200-2 and 200-3 are essentially the same in FIG. 3 as in FIG. 2. However, to complete step 200-4, there is a new field added to the original ACF; this field is designated activeStation. If this field is "true", the caller knows agent 304 has been successfully created by GK 330-1, and the caller can be assured that the H.245 will be performed by agent 304. This information will be used later to send a message in step 300-9.5, a new step for the invention. If this field is "false", the caller will perform the H.245 procedure by itself later in the process flow. The foregoing handling of step 200-4 has presumed that both mobile terminal 301 and GK 330-1 are both "active-capable", that is, able to handle active packets. However, to ensure that the arrangement of the present invention is "downward compatible", it is necessary to consider when one or both terminal 301 and GK 330-1 are not "active-capable." If mobile terminal 301 is active-capable, but GK 330-1 is not active-capable (e.g., GK 130), then the gatekeeper will not understand the active ARQ request sent by mobile terminal 301, and mobile terminal 301 will not receive a response. To handle this situation, a mechanism such as a timer, is associated with the active ARQ sent by active capable terminal 301. If the timer expires, then terminal 301 sends the original ARQ instead of an active packet. In the case that terminal 301 is not active-capable but GK 330-1 is active-capable, GK 330-1 simply performs the original H.323 and replies with the original ACF to the non active-capable terminal.

Steps 200-5 and 200-6 of FIG. 3 are identical to the original H.323 steps of FIG. 2. After the callee (terminal 302) gets the SETUP of step 200-5, terminal 302 responds with a CALL PROCEEDING message (Step 200-6) and sends an active ARQ packet to GK 330-2 as per step 200-7. The format of packet 200-7 is shown in FIG. 4B. Similarly, the active packet sent by terminal 302 initiates a corresponding agent 306 associated with GK 330-2; agent 306 will in effect, represent terminal 302 during the H.245 signaling phase.

Steps 200-7 and 200-8 of FIG. 3 function in the same manner that steps 200-1 and 200-4, respectively, function for FIG. 3. Thus, if activeStation is "true" in the ACF of step 200-8, terminal 302 sends the message of step 200-9 with the H.245 address set to the GK 330-2's address. Therefore, agent 306 in GK 330-2 will be contacted for the H.245 negotiation. If the activeStation is false in the ACF step 200-8, or terminal 302 receives an original ACF without an activeStation field, terminal 302's address will be used in step 200-9. When terminal 301 receives the message of step 200-9 and agent 304 is instantiated, terminal 301 sends an active packet to (i) fill data to agent 304, and (ii) inform agent 304 to perform H.245 procedures; this is a new step for the illustrative embodiment, and is referred to as step 300-9.5. The make-up of this latter active packet, shown in FIG. 4C, has a program portion 410-2 and a data portion 420-2. Program portion 410-2 contains instructions: (i) so that GK 330-1 initiates a program to fill data into the agent; and (ii) triggers agent 304 to commence the H.245 protocol using the priorly defined steps 200-10 through 200-17; data portion 420-2 has data for the H.245 protocol and the address sent in the message of step 200-9. The address informs agent 304 whether agent 306 or the actual mobile terminal 302 should be connected. (It is noted that if only one mobile terminal is active-capable, only one agent is running to communicate with the other actual mobile terminal to perform H.245 negotiation so as to preserve downward compatibility). Similarly, when terminal 302 sends the message of step 200-9 and agent 306 is instantiated, terminal 302 sends an active to (i) fill data to agent 306, and (ii) inform agent 306 to perform H.245 procedures. Assuming both the agents perform handshaking and negotiation on behalf of the mobile terminals, each gatekeeper informs its corresponding, mobile terminal of the RTP/RTCP addresses via new step 300-18. The channel is now open for transmission.

Figure 4C:
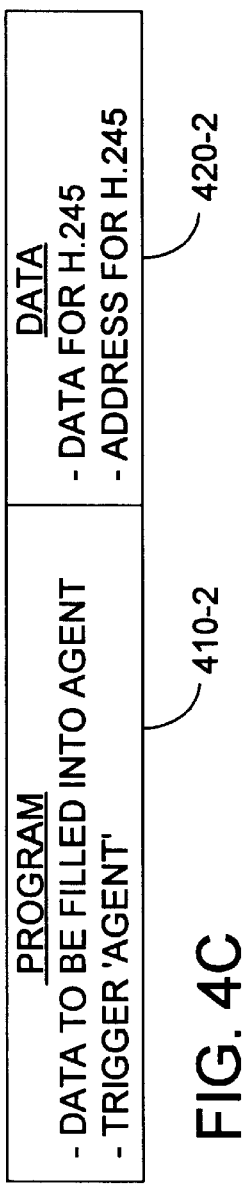

It is noted that all other packets, that is, all packets not exemplified in FIGS. 4B and 4C, are standard packets, that is, the packets are not active packets. It is further noted that the packets conveyed by steps 200-4 and 200-8 are modified versions of the original ACF request, as modified by the activeStation parameter. Also, the packet as conveyed by step 300-18 conveys the same information as the packets of step 200-15 and 200-17.

By way of generalization, it is noted that steps 200-5, 200-6, 200-9, and 200-10 through 200-17 may go through a base station, that is, terminal 301 communicates directly with terminal 302 only when they are in the same cell of a mobile network.

Figure 5:
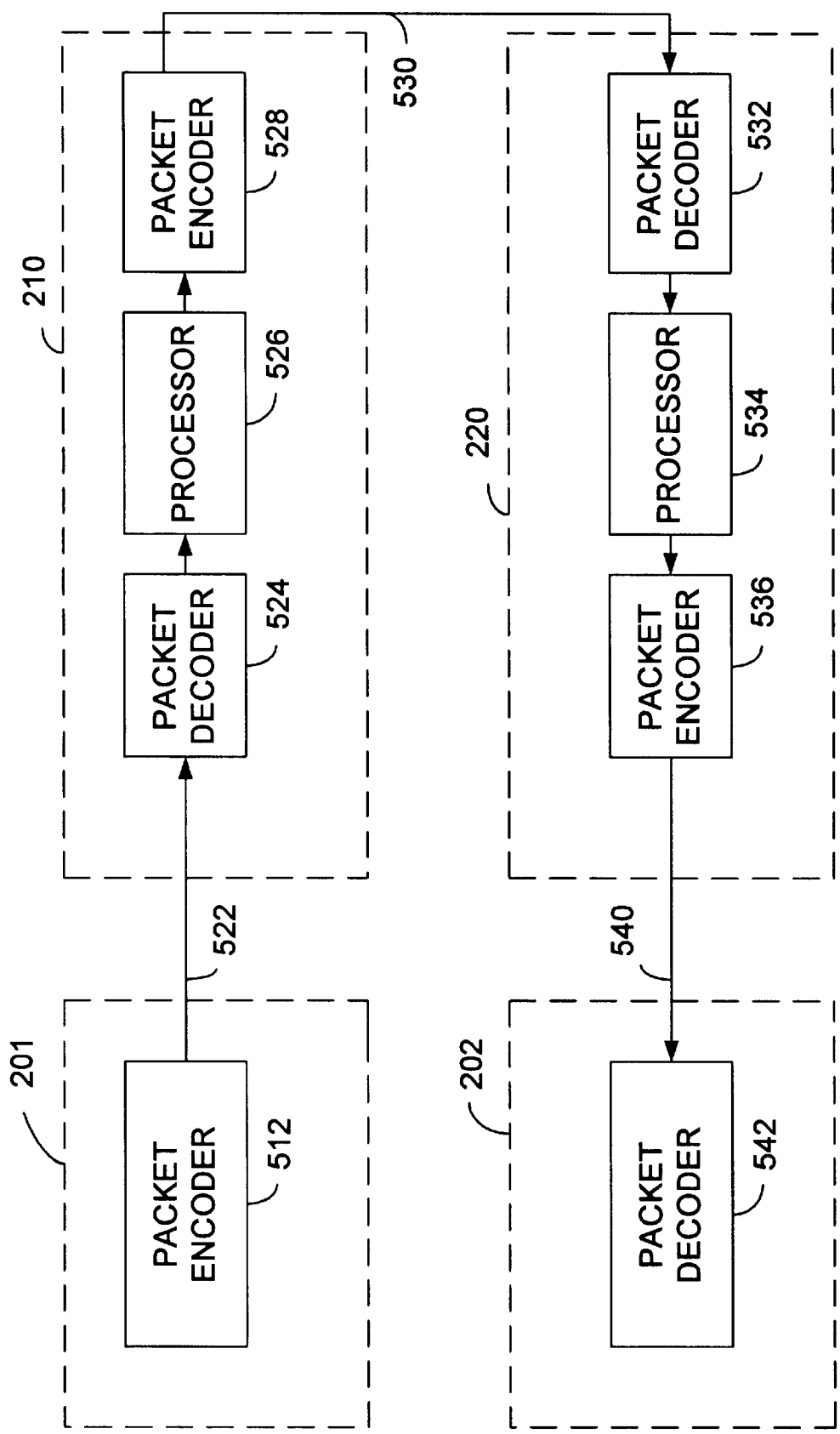
FIG. 5 is a high-level block diagram of components in the conventional system of FIG. 2.

Block Diagram for Terminals and Gatekeepers of the Conventional Signaling System With reference to FIG. 5, there is shown a more detailed block diagram of the components as well as the interconnection among components already set forth in high-level block diagram form in the conventional signaling arrangement of FIG. 2. In particular (focusing on the functionality important to the present invention), for an outbound non-active packet message transmitted from conventional terminal 201 destined for conventional terminal 202 as passed through gatekeepers 210 and 220, terminal 201 composes the non-active packet (e.g., ARQ request) and then transmits this packet over path 522 to gatekeeper 210. In turn, gatekeeper 210 receives the outbound packet over path 522, and passes the detected packets to packet decoder 524 to derive information for processing by processor 526. Such information includes, for example, certain of the messages of the RAS protocol set forth in Appendix A (e.g., ARQ). Processor 526 also prepares an outgoing packet for transmission over path 530 to gatekeeper 220, based upon information derived from the original outbound packet. Gatekeeper 220 performs a similar set of packet processing functions as gatekeeper 210, namely, decoding the incoming packet from path 530 via packet decoder 532, processing of pertinent packet information by processor 534, and generating an outgoing packet by packet encoder 536. In turn, the outgoing packet is communicated over path 540 to packet decoder 542 of terminal 202. Typically, terminal 202 responds to the arriving packet by decoding the arriving packet in packet decoder 542 to derive information used by terminal 202 to send a return packet, if necessary, to terminal 201. If a return packet is necessary, then the converse functionality of the components of FIG. 5 is utilized, namely, terminal 202 becomes the transmitting terminal and terminal 201 becomes the receiving terminal, and the structure and operation of a return-packet can readily be discerned from the arrangement of FIG. 5.

Figure 6:
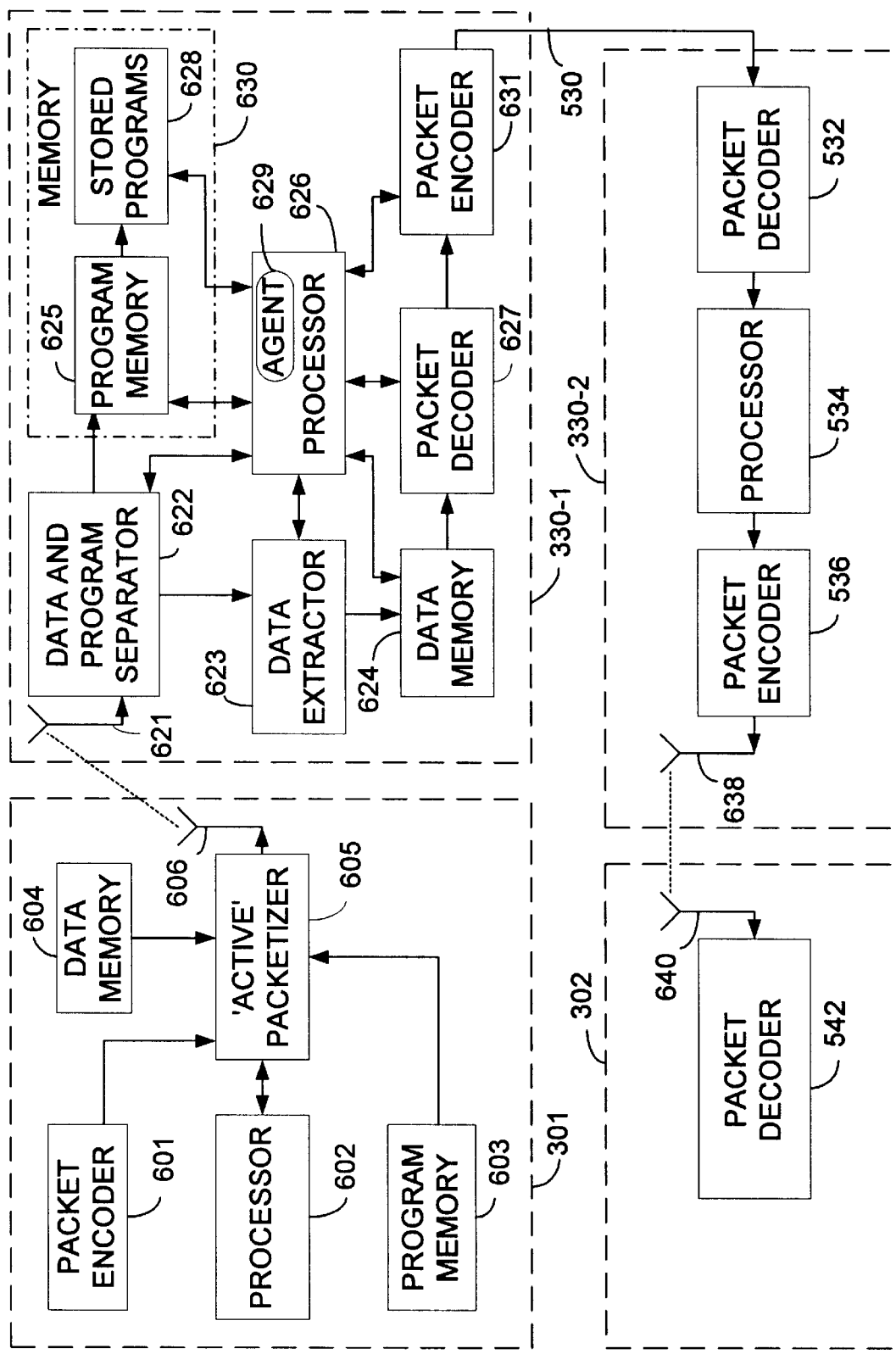
FIG. 6 is a high-level block diagram of components of the system in accordance with the present invention as based upon FIG. 3.

Block Diagram for Terminals and Gatekeepers of the Illustrative Embodiment in Accordance With the Signaling Aspect of the Present Invention As depicted in FIG. 6, which is the counterpart to FIG. 5 in accordance with the present invention, an active packet is to be sent from terminal 301 to terminal 302 via gatekeepers 330-1 and 330-2. Terminal 301 is composed of: packet encoder 601 (essentially the same as encoder 512 of FIG. 5), processor 602, program memory 603, data memory 604, active packetizer 605 and over-the-air propagation device 606 (e.g., an antenna). (In other embodiments, packets sent by terminal 301 may go through other nodes (for example, a base station) to gatekeeper 330-1. In such embodiments there may be no antenna in 330-1). It is recalled that an active packet may include a program portion and a data portion as per FIG. 4A; program memory 603 provides the program portion and data memory 604 provides the data portion for each active packet. Encoder 601 places the active packet in the proper format for the protocol under consideration; for example, see Appendix C for the format of an ARQ packet. Active packetizer 605, operating under control of processor 602, assembles the active packet and delivers the active packet to device 606 for propagation.

Gatekeeper 330-1 in this embodiment receives the incoming active packet via over-the-air receiving device 621 and delivers the active packet to data and program separator 622. In separator 622, program portion 410 is obtained and delivered to program memory 625 for storage; program memory 625 is a region of gatekeeper memory 630. Memory 630 also has region 628 that contains the stored programs executable by agent 629. Agent 629 is shown as an instantiated process in processor 626. The program instructions contained in the active packet which are delivered to program memory 625 control which of the stored programs are to be executed by agent 629. Separator 622 also strips data portion 420 from the incoming active packet and delivers this data portion to data extractor 623. Data extractor 623 functions to further subdivide the data portion into data used by agent 629 running in processor 626 (e.g., 'data for H.245' in 420-2 of FIG. 4C) and data which may be part of a re-formed non-active packet to be emitted by gatekeeper 330-1 (e.g., 'original' ARQ packet in 420-1 of FIG. 4B). The data used in the re-formed packet is stored in data memory 624; data memory 624 may also be a region in memory 630, but it is shown separately for expository purposes. Decoder 627 decodes the data portion of the active packet (in the same manner as decoder 524 of FIG. 5). Packet encoder 631 produces the re-formed non-active packet (in the same manner as encoder 528 of FIG. 5), under control of processor 626 using decoded information available from decoder 627, for delivery to gatekeeper 330-2 via path 530. Gatekeeper 330-2 performs essentially the same signal processing functions as gatekeeper 220 of FIG. 5. The main difference is that over-the-air propagation device 638 delivers the outgoing packet to terminal 302, which receives the outgoing packet via its over-the-air detection device 640. Similarly, terminal 302 is the counterpart of terminal 202 of FIG. 5, which processes the incoming packet to determine the appropriate response. (In other embodiments, there may be no antenna in gatekeeper 330-2).

Flow Diagram of a Transmitting Mobile Terminal for Signaling

Figure 7:
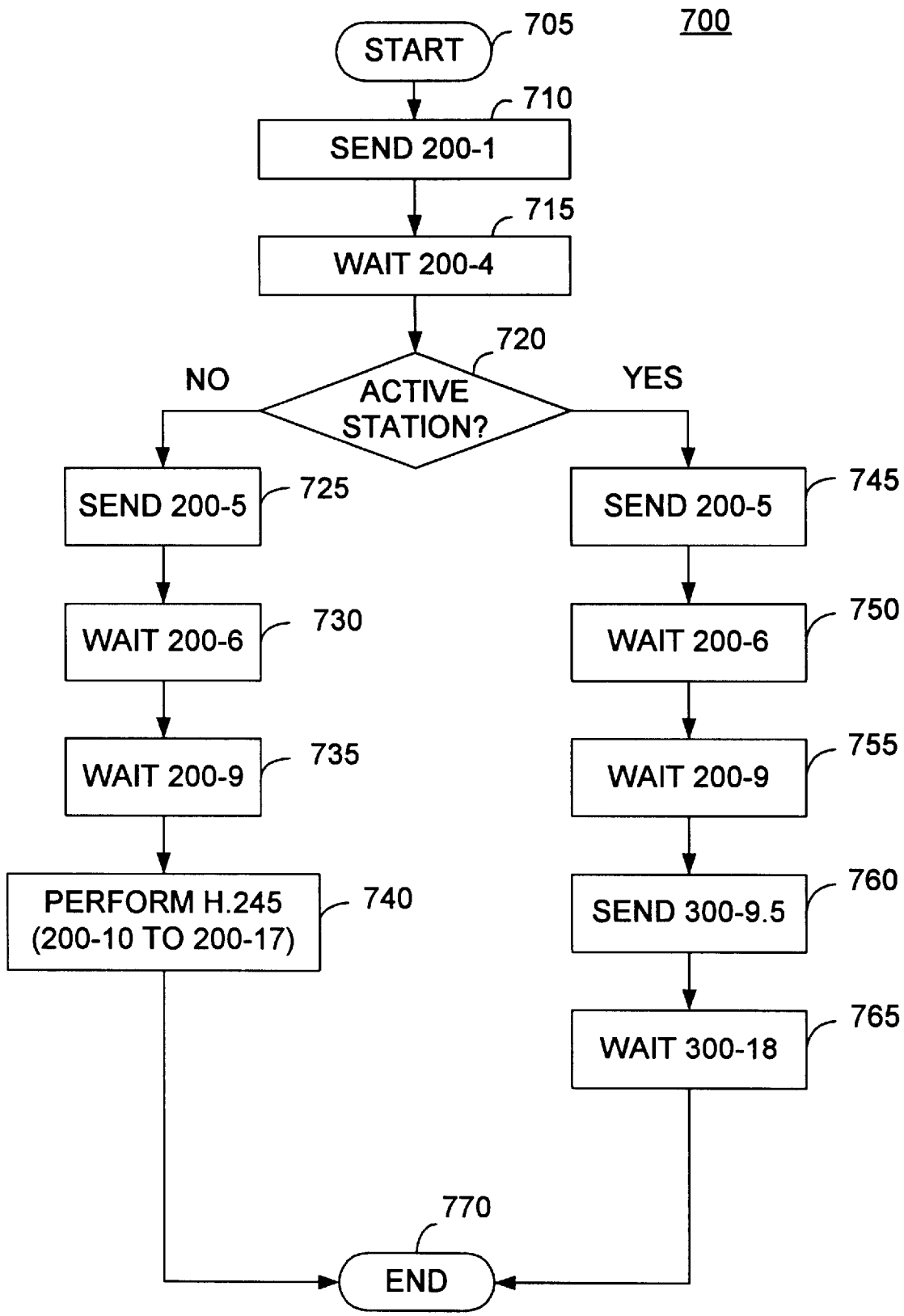
FIG. 7 is a flow diagram for a mobile terminal when conveying transmitted messages.

Flow diagram 700 of FIG. 7 illustrates the processing performed by terminal 301 of FIG. 3, as the originator, to setup an open channel connection to terminal 302. After the 'start' step of processing block 705, terminal 301 sends a message via step 200-1, as exemplified by processing block 710, to gatekeeper 330-1, and awaits a response from gatekeeper 330-1 via the message of step 200-4, as depicted by processing block 715. Next, processing block 720 is invoked to determine if gatekeeper 330-1 is an activeStation, and if so, processing by block 745 is then invoked to send a message via step 200-5. A response to this message is expected via step 200-6 of processing block 750, and terminal 301 awaits the response. In the meantime, terminal 302 is determining if it can proceed by interacting with its associated gatekeeper 330-2, so terminal 301 must also await a message via step 200-9, as exhibited by processing block 755, to confirm terminal 302 active status before proceeding. After confirmation of the status of terminal 302 as well as receipt of an H.245 address (namely, gatekeeper 330-2's H.245 address), terminal 301 sends a trigger message to gatekeeper 330-1 via step 300-9.5, as invoked by processing block 760, to inform agent 304 to complete the H.245 protocol on behalf of terminal 301. Finally, terminal 301 awaits the message conveyed by step 300-18, as shown by processing block 765, with the RTP/RTCP information indicative of an opened logical channel. If gatekeeper 330-1 is not an activeStation, then the processing blocks 725 (send of step 200-5), 730 (wait of step 200-6), 735 (wait of step 200-9) and 740 (perform H.245 of steps 200-10 through 200-17) are completed in series to arrive at the opened logical channel state. Block 770 ends the processing by terminal 301.

Figure 8:
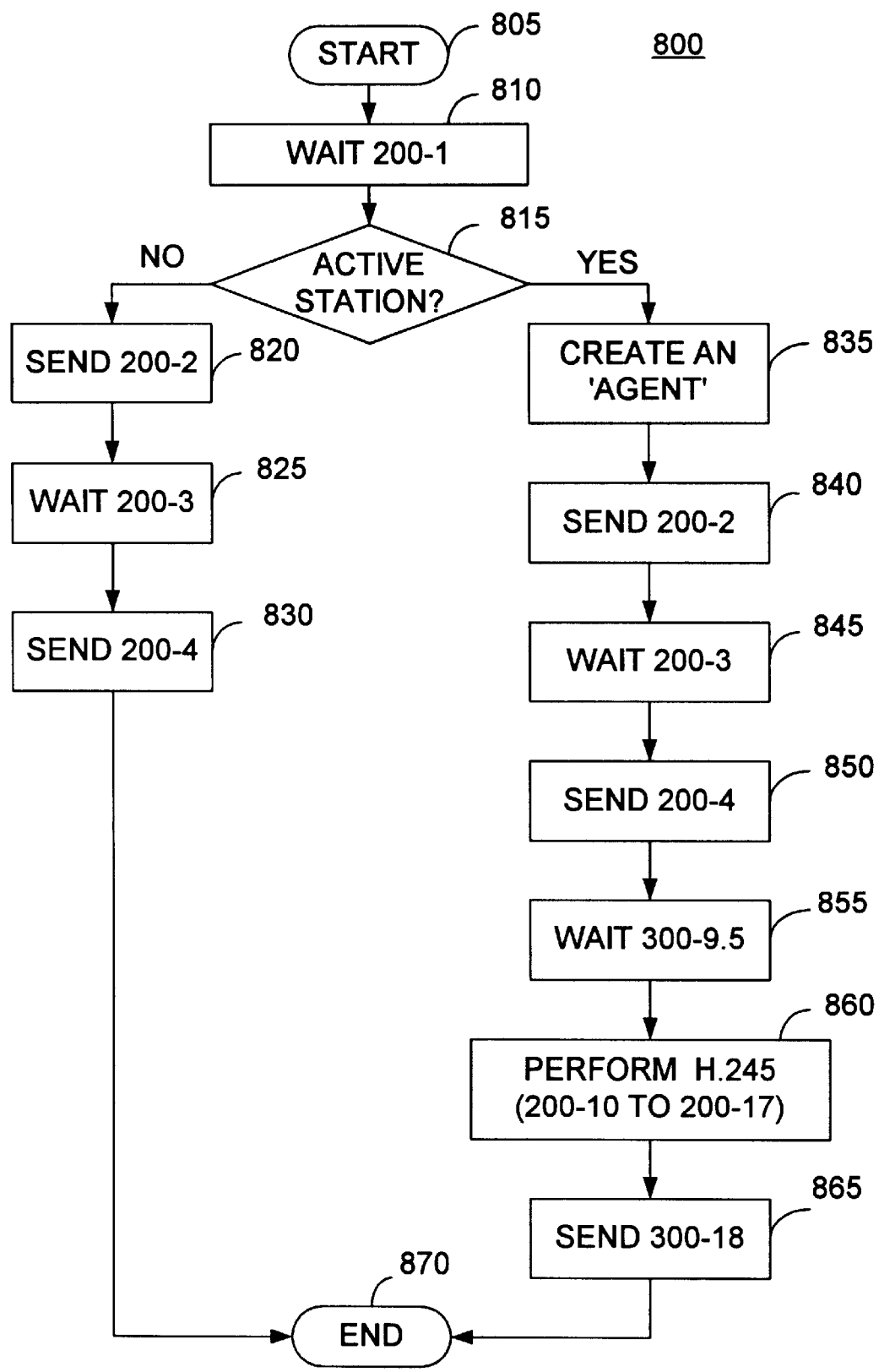
FIG. 8 is a flow diagram for a gatekeeper when passing on transmitted messages from a mobile terminal.

Flow Diagram of Gatekeeper Responsive to Transmitting Mobile Terminal for Signaling Flow diagram 800 of FIG. 8 illustrates the processing performed by gatekeeper 330-1 associated with terminal 301 of FIG. 3 as terminal 301 completes flow 700 of FIG. 7. After the 'start' step of processing block 805, gatekeeper 330-1 awaits the packet sent by terminal 301 via step 200-1 as evidenced by processing block 810. Next, decision block 815 is entered to determine if gatekeeper 330-1 is an activeStation. If so, then a branch to processing block 835 is taken, whereupon gatekeeper 330-1 instantiates an 'agent' (e.g., 304) to manage the H.245 protocol. Moreover, gatekeeper 330-1, via processing block 840, sends the step 200-2 message to gatekeeper 330-2, and awaits the return message of step 200-3 as shown by processing block 845. In turn, gatekeeper 330-1 returns, via processing block 850, the message of step 200-4 to terminal 301. Next, gatekeeper 330-1 enters a wait state awaiting the message of step 300-9.5 to thereby trigger the instantiated agent 304 and fill the data Agent 304 carries out the H.245 protocol exhibited by steps 200-10 through 200-17. Once the H.245 negotiation is completed, gatekeeper 330-1 invokes processing block 865 to inform terminal 301, via step 300-18, of the opened logical channel. If gatekeeper 330-1 is not an activeStation, then processing branches to the series of blocks 820 (send of step 200-2), 825 (wait of step 200-3), and 830 (send of step 200-4). Either processing block 830 or processing block 865 ends the processing by gatekeeper 330-1 for this open channel sequence, as depicted by end processing block 870.

Flow Diagram of a Mobile Terminal Associated With a Remote Gatekeeper

Figure 9:
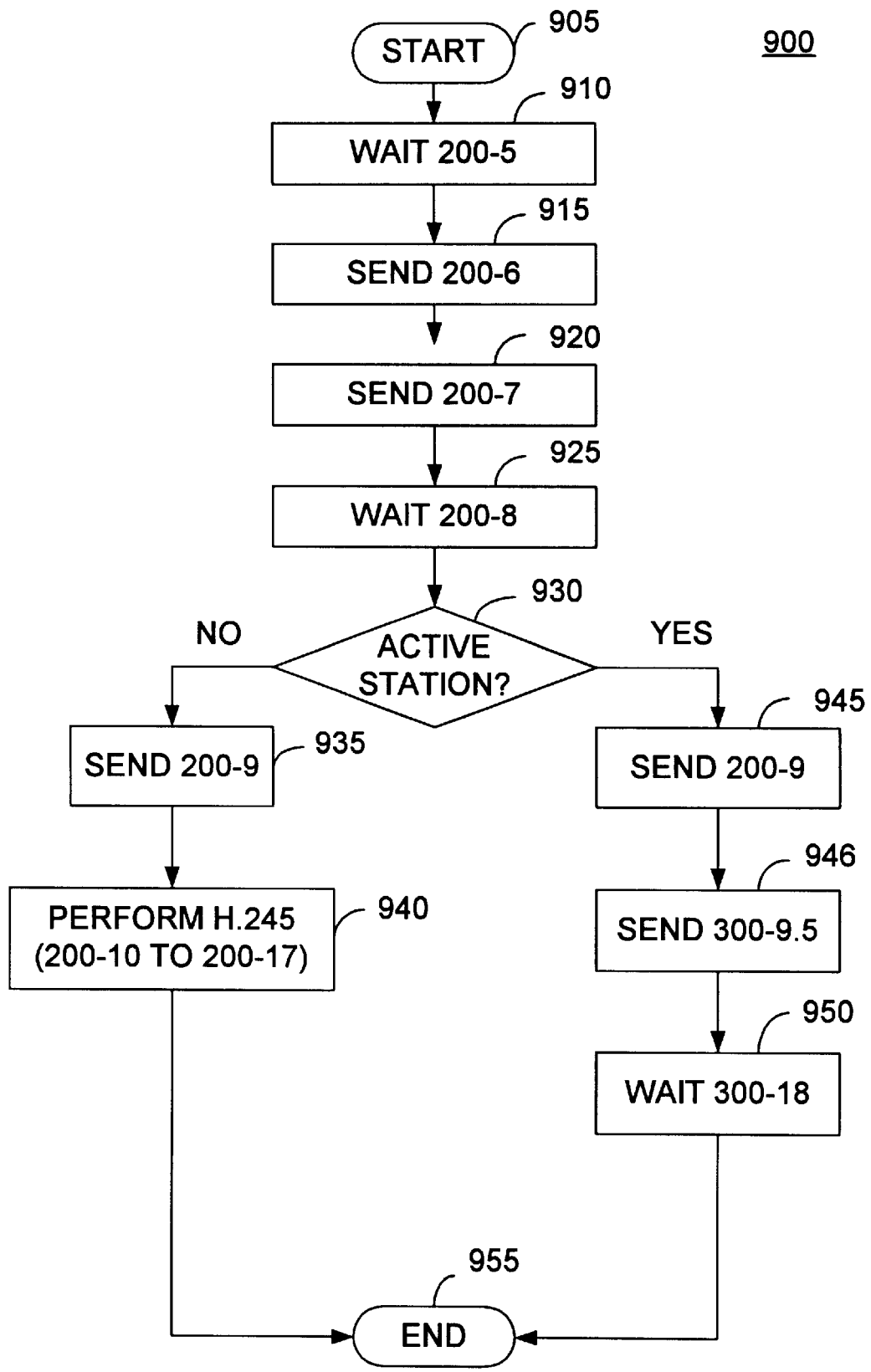
FIG. 9 is a flow diagram for a mobile terminal when receiving messages from another mobile terminal and a gatekeeper.

Flow diagram 900 of FIG. 9 illustrates the processing performed by terminal 302 that communicates with associated gatekeeper 330-2. After the 'start' step of processing block 905, terminal 302 waits for the message of step 200-5 as evidenced by processing block 910. In response to this message, terminal 302 responds with the message of step 200-6 as shown by processing block 915. Next, processing block 920 is invoked to send the message of step 200-7 directly to gatekeeper 330-2. In turn, terminal 302, via processing block 925, waits for the message of step 200-8 as returned from gatekeeper 330-2. Then, decision block 930 is entered to determine the activeStation status of gatekeeper 330-2. If gatekeeper 330-2 is active, then processing block 945 (send of step 200-9), processing block 946 (send of step 300-9.5), and block 950 (wait of step 300-18) are completed. If gatekeeper 330-2 is not active, then processing blocks 935 (send of step 200-9) and 940 (perform H.245 of steps 200-10 through 200-17) are completed instead. Processing block 955 ends processing for this sequence of signaling messages.

Flow Diagram of a Gatekeeper Communicating with a Remote Gatekeeper

Figure 10:
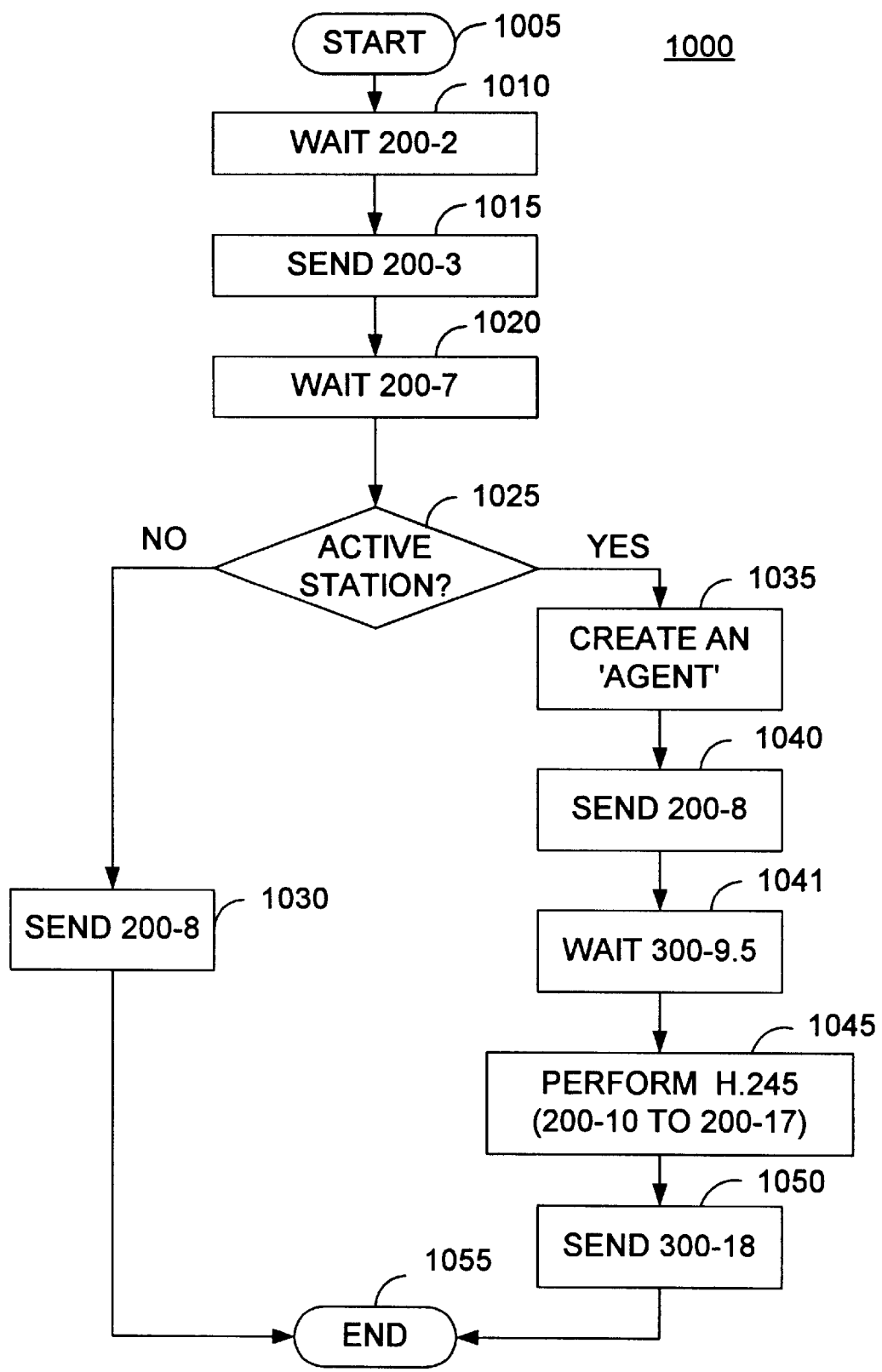
FIG. 10 is a flow diagram for a gatekeeper when receiving messages from another gatekeeper and a mobile terminal.

Flow diagram 1000 of FIG. 10 illustrates the processing performed by gatekeeper 330-2 communicating with remote gatekeeper 330-1 as well as associated terminal 302. After the 'start' step of processing block 1005, gatekeeper 330-2 awaits the message of step 200-2, as indicated by processing block 1010. Next, processing block 1015 is initiated to send the message of step 200-3. Then processing block 1020 is entered to await the message of step 200-7. Decision block 1025 determines if gatekeeper 330-2 and/or terminal 302 is an activeStation. If not, only the message of step 200-8 is sent via processing block 1030 before processing ends with block 1055. On the other hand, if gatekeeper 330-2 is active, the following sequence of five processing blocks is completed: block 1035 instantiates agent 306; block 1040 sends the message of step 200-8; block 1041 awaits the message of step 300-9.5; block 1045 performs H.245 via steps 200-10 through 200-17; and block 1050 sends the message of step 300-18.

2. Mobility Aspect of the Present Invention, Including an Illustrative Embodiment In this Section, the approach for mobility management in IP networks by active packets is presented; the approach is a general mobility management technique, which is not limited to any specific signaling or application.

As suggested by the discussion of the Background Section, Mobile IP can provide so-called "macro-mobility" over a wide area in which the mobile terminal moves from one subnet to another subnet. (Here, a subnet is used in the sense defined by an IP address, which has the form, for example, "w.x.y.z" (e.g., 129.3.2.14), wherein "w.x" is the network address (129.3), "y" (2) is the subnet address for the given network, and "z" (14) is the host address for the given network/subnet, such as a mobile terminal or a base station.

In a local area, however, Mobile IP is not fast enough for real-time applications when a mobile terminal moves frequently. The mobility aspect of the present invention relates to "micro-mobility" in a local area in which each mobile terminal maintains its IP address as it moves between serving areas or cells within the same subnet. The mobility of a mobile terminal across subnets (macro-mobility) is handled by Mobile IP.

From another viewpoint, using the ISO Open Systems Interconnection (OSI) layer model, wherein the "physical" layer is the bottom layer, the "data link" layer (called the "link" layer hereafter) is above the "physical" layer, and the "network" layer (also the "IP" layer hereafter) is above the "link" layer, then micro-mobility handles the "link" layer and macro-mobility handles the "IP" layer. Techniques exist in the art for micro-mobility, but typically they are not publicly available due to their proprietary nature.

Figure 11A:
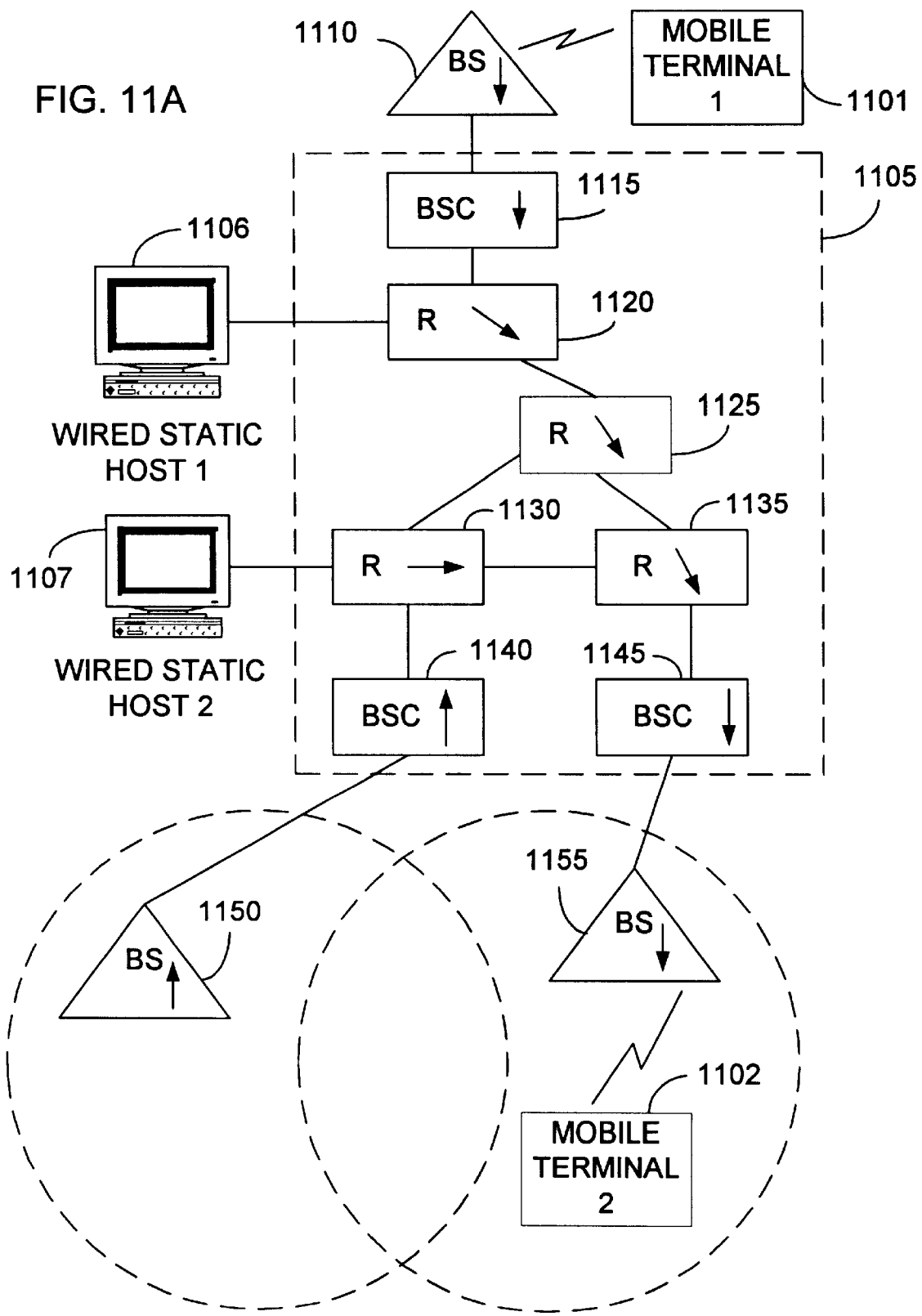
FIGS. 11A, 11B, 11C, and 11D depict an arrangement for mobility management in accordance with the present invention.

To make the discussion more specific (but without loss of generality), as shown in FIG. 11A, two base stations (BSs) 1150 and 1155 usually have overlapping areas (each area is shown as a dashed circle encompassing a corresponding BS) in which mobile terminal (MT) 1102 can transmit and receive signals from both BSs 1150 and 1155. Generally, as MT 1102 moves about, the SNR (signal-to-noise ratio) for each BS as measured by MT 1102 varies. Suppose initially that MT 1102 is communicating with BS 1155. When MT 1102 moves away from BS 1155, the SNR pertaining to BS 1155 decreases. At a certain point in its movement, MT 1102 decides, based upon a pre-determined threshold, that the over-the-air link to its current BS 1155 is poor when the SNR is below the threshold (e.g., 40% of the original SNR ratio). MT 1102 then uses a so-called "scanning algorithm" to search for another BS, which for FIG. 11A is BS 1150. (The scanning algorithm is conventional to a mobile service environment, and it is carried out at the "physical" layer level.)

If the search is successful, MT 1102 has roamed to new BS 1150, and now communicates with BS 1150. Otherwise, MT 1102 continues to scan for another BS. Typically, MT 1102 accepts the new BS when the SNR to BS 1150 is a prescribed amount above the predetermined threshold (e.g., 50%).

To explain the next phase of the operation, certain notation must be covered. A wireless network interface card (NIC) of a MT is assigned a unique address by the manufacturer of the particular NIC—this address is called the "MT MAC address" or, equivalently, the "MT MAC identifier" (MT MAC ID), where MAC is the acronym for Medium Access Control; the MAC Address is utilized at the "link" layer. Each MT MAC address usually has 48 bits which can be formatted as follows: "B1:B2:B3:B4:B5:B6", where B1, B2, . . . is each one byte. Also, since each byte can be treated as containing two 4-bit nibbles, the MT MAC address is such that each nibble can be expressed in hexadecimal. Thus, a typical MT MAC address might be: "18:00:20:E8:42:F6". Other devices of FIG. 11A also have a unique MAC address or identifier (ID); for instance, each BS of FIG. 11A has a unique MAC address, as well as each Base Station Controller (BSC) and Router (R). It is supposed for later discussion that the MAC address of BS 1150 is 15:15:07:F6:B2:C2; BS 1155 is 20:10:05:E8:A1:B1; BSC 1140 is 35:17:18:19:A2:E4; and BSC 1145 is 05:07:09:F1:D2:D3.

Besides the MT MAC Address, a MT is also assigned a unique IP address which is utilized by the "IP" layer. Other devices of FIG. 11A also have unique IP addresses; for instance, each BS of FIG. 11A has a specified IP address, as well as each BSC and R. As outlined above, it is supposed that the IP address of MT 1102 is 129.3.2.10, BS 1150 has IP address 129.3.2.2, BS 1155 has IP address 129.3.2.1, BSC 1145 has IP address 129.3.2.3, and BSC 1140 has IP address 129.3.2.4.

The MT MAC address (MT link-layer address) and IP address (MT network layer address) of each device (MT, BS, BSC, R) are then used to fill-in tables (called Forwarding Tables) in, for example, BS 1155 and BSC 1145 as exemplified by Table 1 below for BS 1155, Table 2 below for BSC 1145, and Table 3 for BS 1150, presuming that MT 1102 initially homes on BS 1155:

TABLE 1

| MT IP Address | Forwarding MAC Address | Time Stamp |
|---|---|---|
| 129.3.2.10 | 18:00:20:E8:42:F6 | 2000.01.03.16.21.32.18 |
| . . . | . . . | . . . |

TABLE 2

| MT IP Address | Forwarding MAC Address | Time Stamp |
|---|---|---|
| 129.3.2.10 | 20:10:05:E8:A1:B1 | 2000.01.03.16.21.32.18 |
| . . . | . . . | . . . |

TABLE 3

| MT IP Address | Forwarding MAC Address | Time Stamp |
|---|---|---|
| 129.3.2.10 | 35:17:18:19:A2:E4 | 2000.01.03.16.21.32 18 |
| . . . | . . . | . . . |

As shown, there are three fields in the forwarding table: the first is the MT IP Addresses of MT's; the second is the Forwarding MAC Address where packets destined for the MT IP Address should be sent; and the third is the time stamp copied from an active packet (the purpose of which is discussed shortly). The Time Stamp has, for example, the format "year-month-day-hour-minute-second-millisecond".

The tables are used to translate MT IP Addresses into MAC addresses; thus, with reference to Table 1, any communication received by BS 1155 destined for MT 1102 is directly forwarded to MT 1102 because of the correlation of its IP and MAC addresses. On the other hand, any communication received by BSC 1145 destined for MT 1102 via its IP address is, as set forth in Table 2, first forwarded to BS 1155 (MAC address 20:10:05:E8:A1:B1). When the communication reaches BS 1155, the communication is forwarded directly to MT 1102, as above, with reference to the Table 1 entries. Table 3 illustrates that any communication received by BS 1150 is forwarded to BSC 1140 via its MAC address. By way of notation, the "arrows" in the various devices/components of FIG. 11A show the "forwarding direction" for a communication received by the device/component which is destined for MT 1102. Accordingly, the "down" arrow in BSC 1145 indicates that an incoming message for MT 1102 is passed to BS 1155. Similarly, for example, the "up" arrow in BS 1150 points to BSC 1140 as a forwarding device which will handle a communication destined for MT 1102.

Continuing now with the discussion of roaming whereby MT 1102 homes on BS 1150 rather than BS 1155, after MT 1102 roams successfully to the BS 1150 (MT 1102 may still in the overlap area as exemplified by FIG. 11B), MT 1102 sends an active packet to BS 1150. The instructions carried by the active packet instruct BS 1150 to update its forwarding table stored in BS 1150; an exemplary forwarding table is Table 4 below (the updated counterpart to Table 3).

TABLE 4

| MT IP Address | Forwarding MAC Address | Time Stamp |
|---|---|---|
| 129.3.2.10 | 18:00:20:E8:42:F6 | 2000.01.03.17.22.30.19 |
| . . . | . . . | . . . |

Figure 11B:
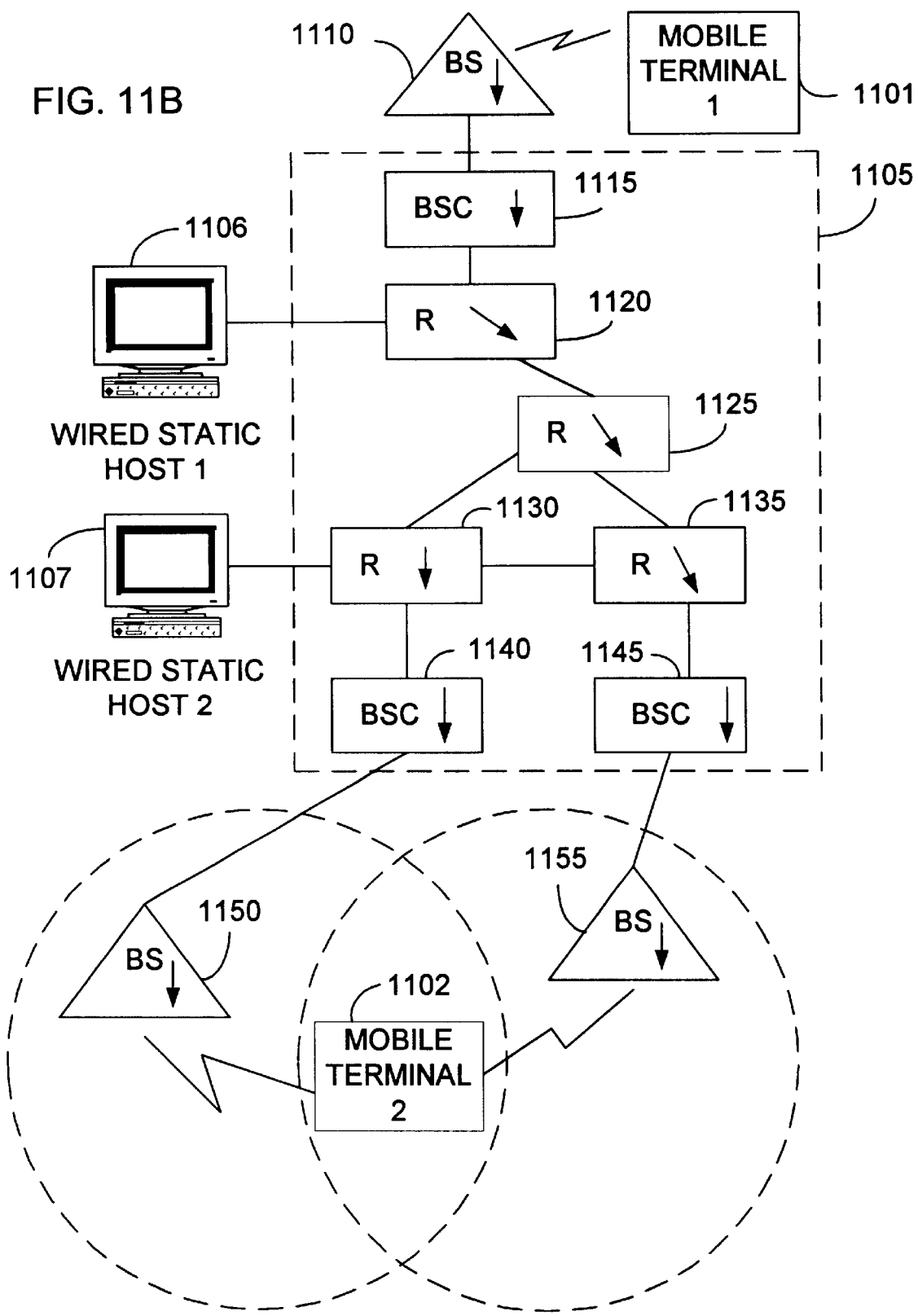

The program portion of the active packet then instructs BS 1150 to replicate the active packet and forward the duplicated active packets to all adjacent BSs, BSCs and routers (so-called "first tier" devices) in the same subnet. In FIG. 11B, the only first tier device is BSC 1140. These active packets also carry the original packet generation time, which indicates when the original packet was generated in MF 1102 (as shown in Table 3). These first tier BSs, BSCs or routers will also replicate and forward the active packets to their adjacent BSs, BSCs, and routers (so-called "second tier" devices) in the same subnet. When the replicated active packets arrive at a BS, BSC, or router, the program instructions carried in the replicated active packet also instructs the BS/BSC/router to check the time stamp already stored in the BS, BSC, or router. If the time stamp field of the forwarding table is different with the one in the active packet, the time stamp in each BS, BSC or router is updated. If the time stamp is the same as the one in the active packet, this active packet instructs the BS/BSC/router that no update is necessary and no more packets will be forwarded from this BS, BSC, or router because it has already been visited by an active packet and the forwarding address accurately reflects the current position of MT 1102. This process eliminates excessive packet duplication and forwarding, but still ensures that all BSs, BSCs, and routers in the network have the current forwarding address of MT 1102. Thus new routes (as depicted by the forwarding arrows of FIGS. 11A–D) through the network can be established to reach MT 1102.

Figure 12:
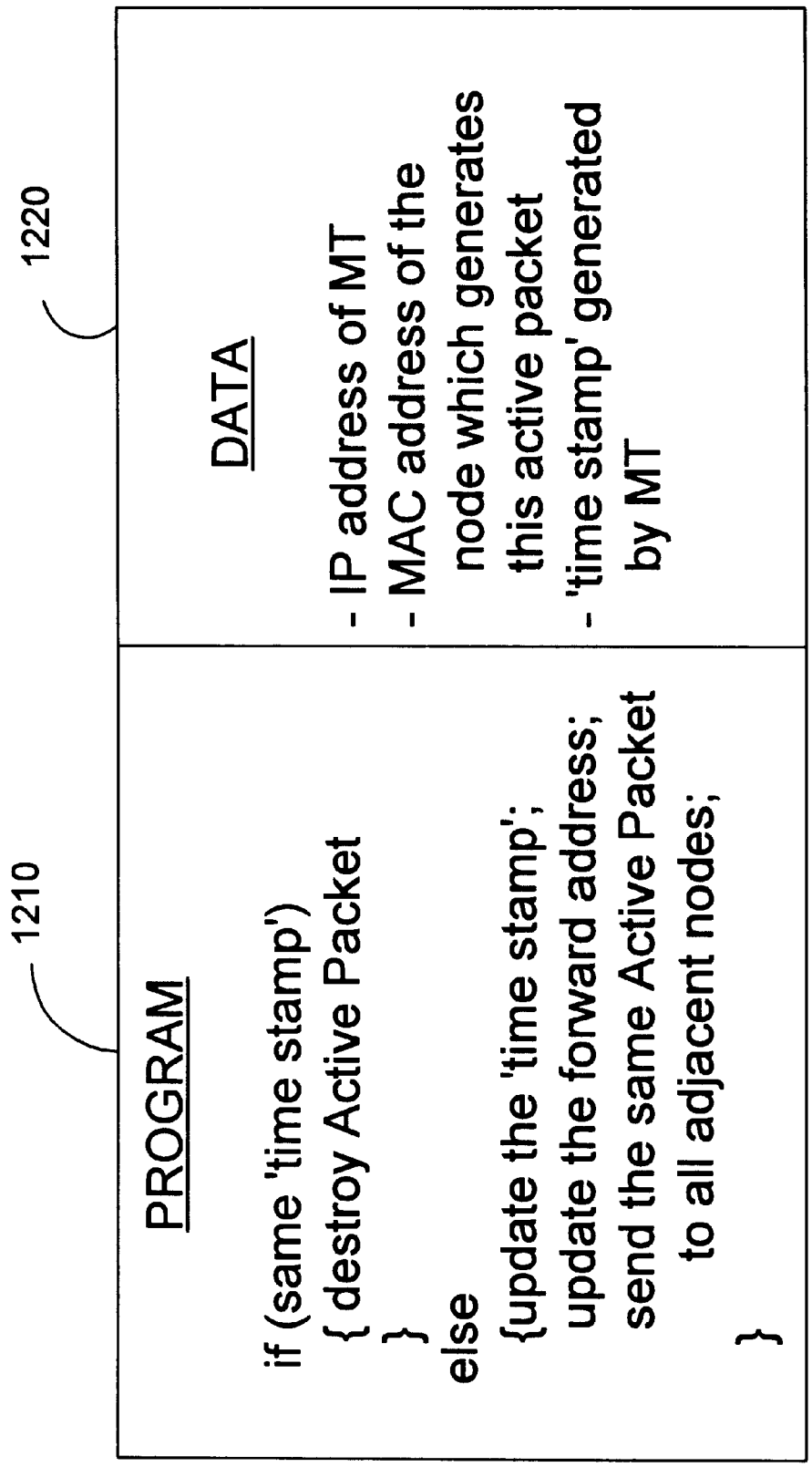
FIG. 12 depicts an active packet emitted by a node to inform adjacent nodes of address information.

The depiction of FIG. 12 shows the program and data parts of an active packet which is emitted by first and second tier devices to mitigate network "flooding" of packets. In particular, program part 1210 conveys instructions to destroy the active packet if the time stamp in the table is the same as the time stamp arriving in the data part 1220. If the time stamps are different, the time stamp in the table is updated and the active packet is then sent to adjacent nodes carrying the information in data part 1220.

Figure 11C:
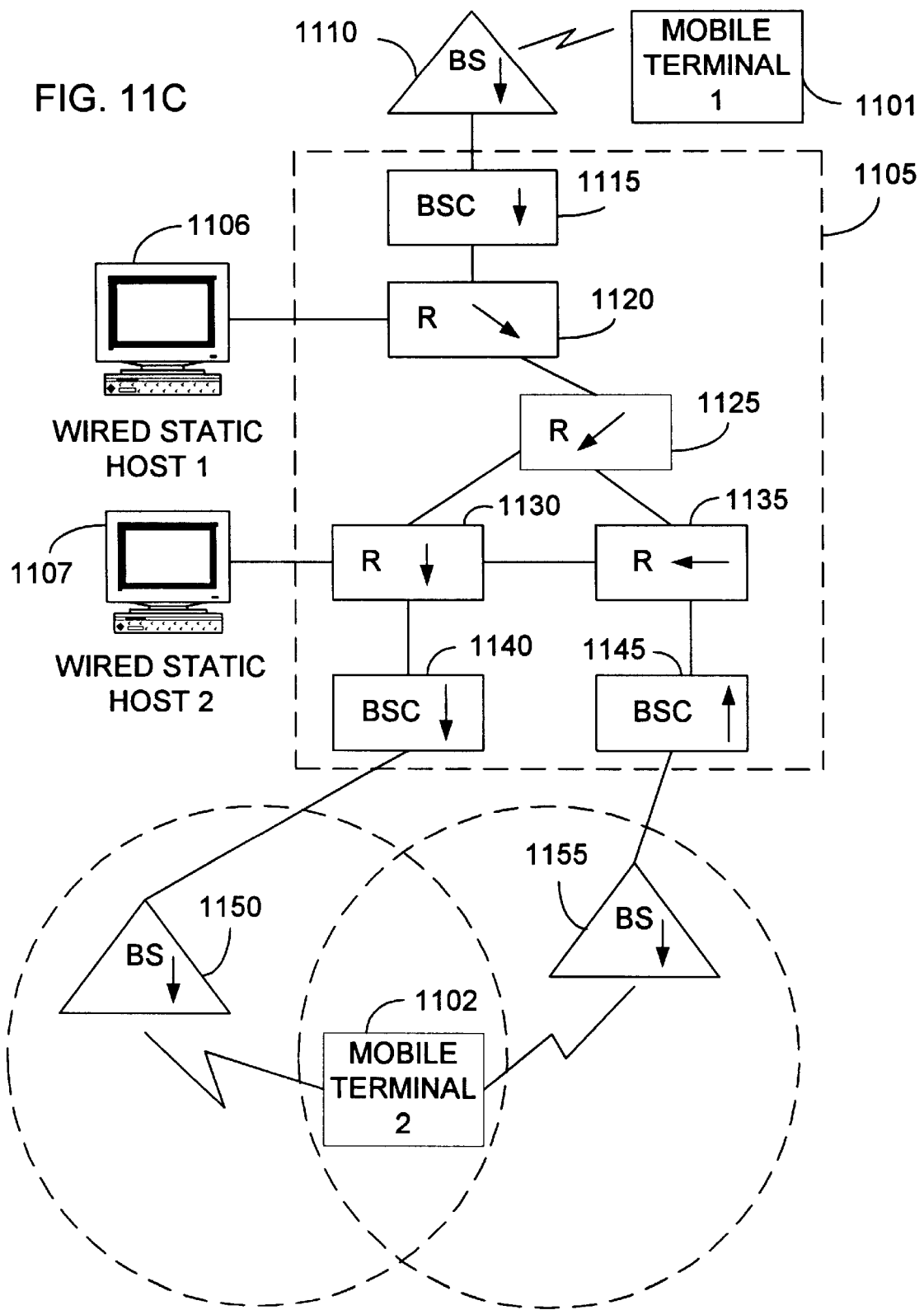
Figure 11D:
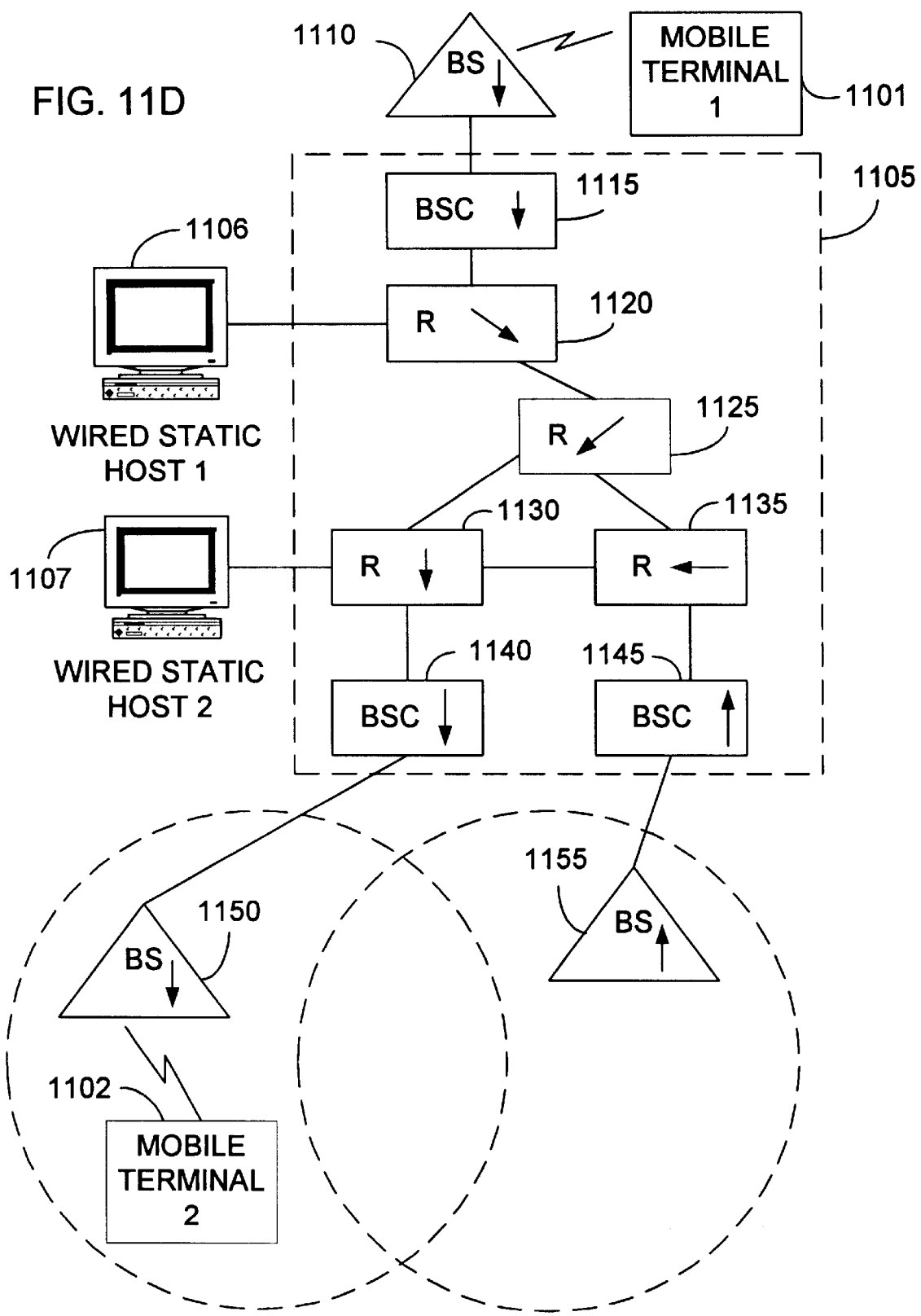

The sequence of FIGS. 11A–D shows an example of how this "active address propagation" techinique operates. FIG. 11A indicates the routes from MT 1101, wired static host 1106, and wired static host 1107 to MT 1102 before handoff. The routes are pointed to by the forwarding address stored in each BS, BSC, and router. FIG. 11B shows the case when MT 1102 just enters the overlap region of BSs 1150 and 1155. Since the active packet may not have propagated to all routers, BSCs and BSs yet, it is possible that only a few of the forwarding addresses have been updated. Therefore, only some routes have been recreated. In FIG. 11B, only BSC 1140 and router 1130 have been reached by an active packet emitted by BS 1150 in response to MT 1102 now homing on BS 1150. Wired static host 1107 routes through BS 1150 to reach MT 1102; the other devices still follow the old forwarding addresses. FIG. 11C indicates that all forwarding addresses have been updated except the old BS, namely, BS 1155. Finally, FIG. 11D shows that all forwarding addresses are updated, and all communication paths are rerouted. Depending on the coverage of the overlap region, the moving speed of a mobile terminal, and the propagation delay, it is possible that the updates are done partially, as those in FIGS. 11B and C, but MT 1102 has already reached the new serving cell. This may require the retransmission of information-bearing packets. However with today's high-speed routers and backbone networks, this is a rare occurrence.

Also note that all source hosts connecting to the fixed (shown as encompassed by dashed box 1105 in FIGS. 11A–D), and wireless networks know the new location of MT 1102. There is no need to reroute the path for each individual source node. The triangle routing of the conventional Mobile IP is eliminated and route optimization is done automatically. In addition, the new forwarding address is updated by the first arriving packet, which means the new path may be the one with least congestion or shortest path. The new route pointed to by the forwarding address is the fastest path in the current network condition.

Figure 13:
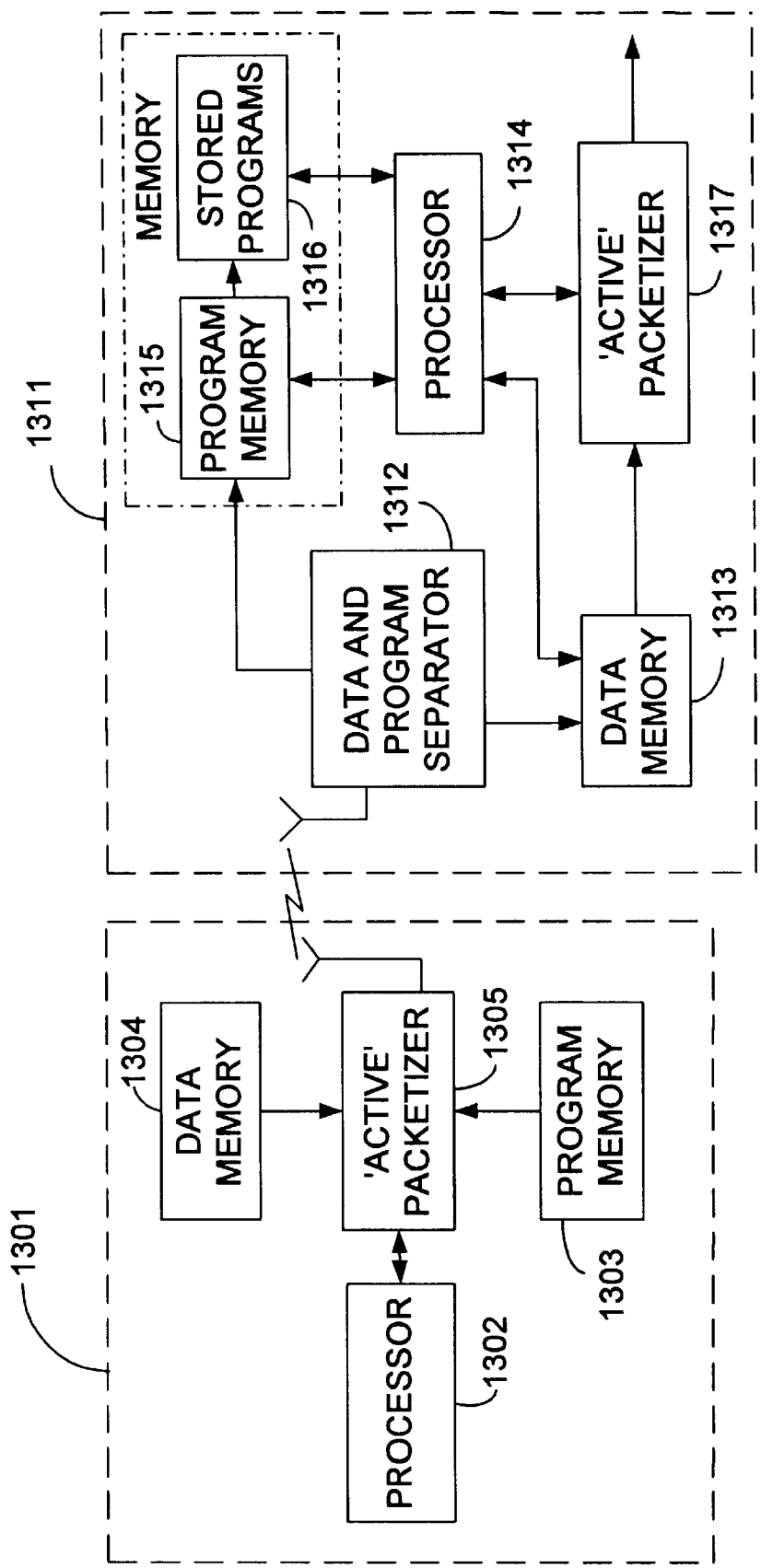
FIG. 13 depicts a block diagram of a mobile terminal communicating with a base station/base station controller/router.

Block Diagram for Mobile Terminal and Base Station of the Illustrative Embodiment in Accordance With the Signaling Aspect of the Present Invention With reference to FIG. 13, there is shown a high-level block diagram of mobile terminal 1301 (being representative of either mobile terminal 1101 or 1102 of FIGS. 11A–11D) for generating and conveying an active packet from terminal 1301 to base station 1311 (being representative of either BS 1150 or 1155 of FIGS. 11A–11D). In particular, terminal 1301 is composed of processor 1302; program memory 1303; data memory 1304; and active packetizer 1305. The structure and operation of the active packet generation and transmission functions of terminal 1301 is yet another version of terminal 301 of FIG. 6. Whereas terminal 301 is also composed explicitly of packet encoder 601, terminal 1301 does not show such an encoder explicitly (recall the purpose of encoder 601 was that of placing an active packet in a format for the network protocol under consideration, as was exemplified in Appendix C). Active packetizer 1305 effects the proper "protocol packaging" of the active packet.

The high level block diagram of device 1311 is composed of data and program separator 1312; data memory 1313; processor 1314; program memory 1315; and stored programs memory 1316. Again with reference to FIG. 6, it is clear that device 1311 is another version of components that implement gatekeeper 330-1 for mobility purposes (note that processor 1314 is not illustrated with an 'agent'). Device 1311 delivers the incoming active packet received over-the-air to separator 1312. The program part of the active packet is stored in program memory 1315; in turn program part, being directly coupled to stored programs memory 1316, can select the appropriate stored programs for execution in processor 1314. Any data required by the execution of the stored programs can be obtained from data memory 1313, which stores data for each corresponding program part. Active packetizer 1317 generates an active packet in proper format for transmission to other devices connected to device 1311.

Flow Diagram of Processing by a Mobile Terminal

Figure 14:
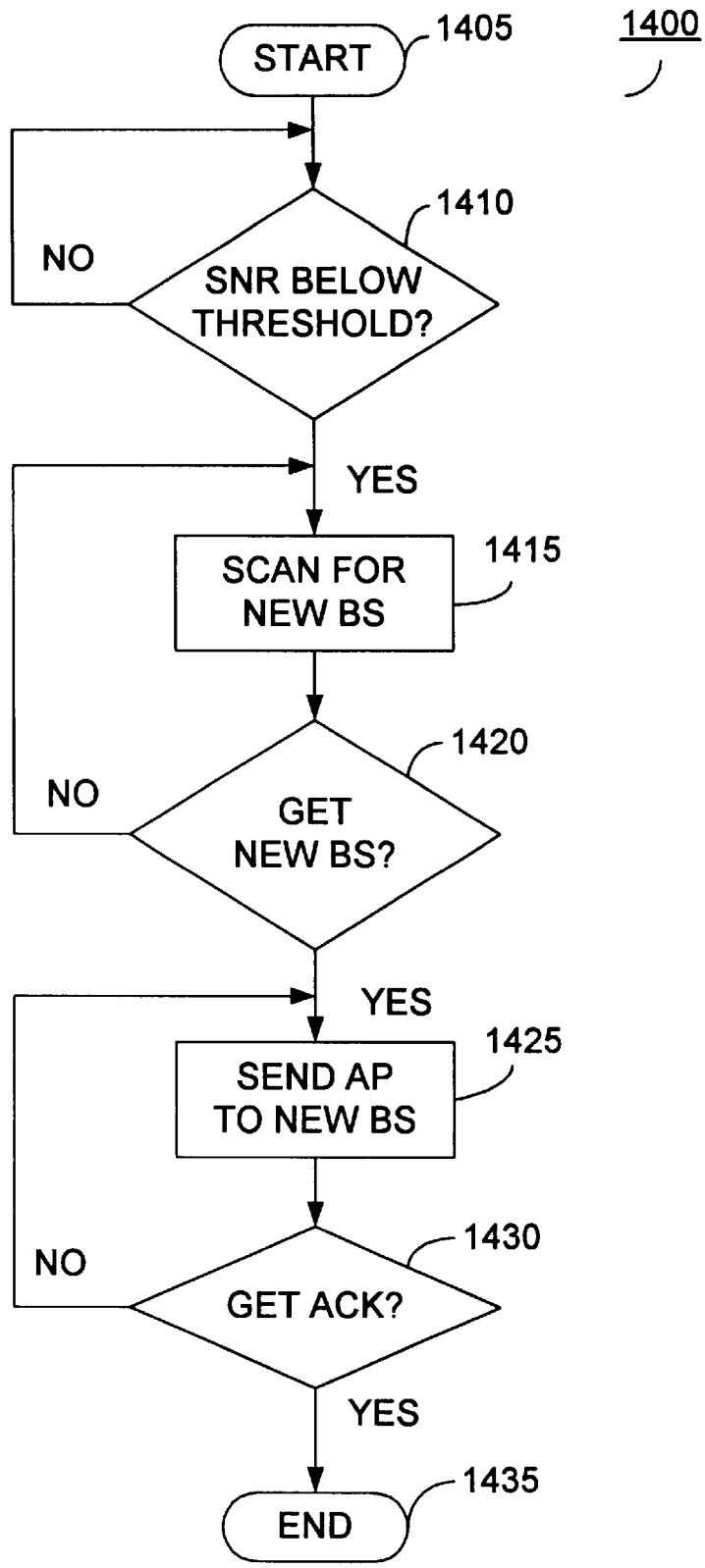
FIG. 14 is a flow diagram of the processes carried out in a mobile terminal.

Flow diagram 1400 of FIG. 14 illustrates the processing performed by a mobile terminal, such as terminal 1102 of FIGS. 11A–D, to determine if and when communications should be re-directed from an original base station (e.g., BS 1155) to a new base station (e.g., BS 1150) as mobile terminal 1102 roams within the subnet. After the 'start" step of processing block 1405, terminal 1102 continues to monitor the received SNR to determine if the SNR is below the predetermined threshold, as evidenced by decision block 1410. If the SNR remains above the threshold, the process of monitoring continues. If the SNR drops below the threshold, then processing block 1415 is entered to effect the "scanning algorithm" at the "link layer", as already discussed earlier. If the scan is not immediately successful in locating a new base station upon which terminal 1102 is to directly communicate, as carried out by decision block 1420, the processes returns to block 1415 wherein scanning for another base station continues. If a new base station has been located, then processing by block 1425 is invoked. Block 1425 sends an active packet (AP) to the new base station so that the new base station may update its forwarding table with the correct MT IP address—MAC address entries, along with the time stamp of this active packet. To ensure that the new base station has received the updated information, decision block 1430 awaits an acknowledgement (ACK) from the new base station. If the ACK is not received within a pre-set time interval, the AP is re-transmitted. Once the ACK is received, block 1435 terminates the processing for this phase of operation of terminal 1102.

Flow Diagram of Processing by a First-Tier Device

Figure 15:
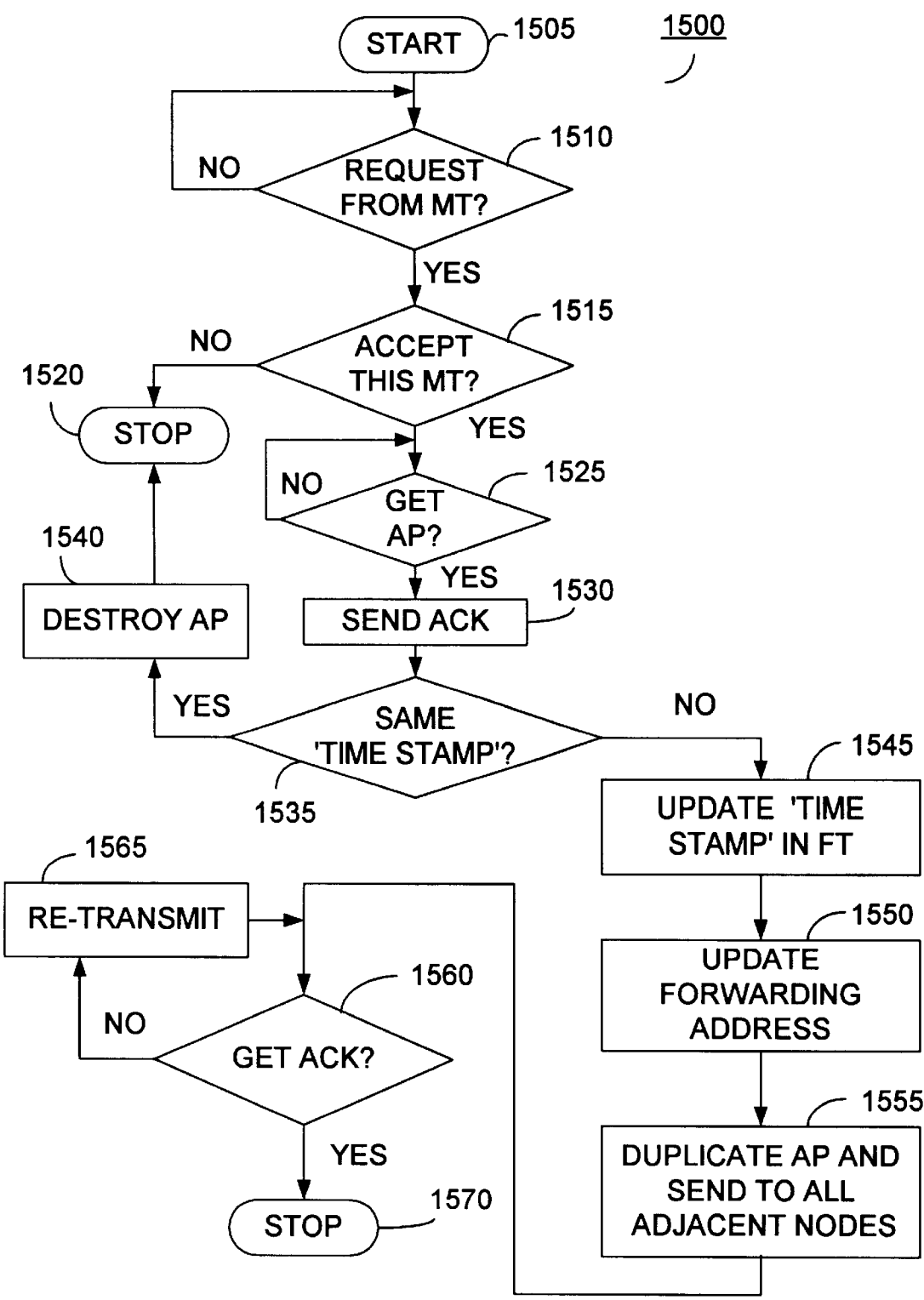
FIG. 15 is a flow diagram of the processes carried out by a "first tier" node.

Flow diagram 1500 of FIG. 15 illustrates the processing performed by a first-tier device, such as BS 1150 of FIGS. 11A–D, to determine if communications should be re-directed from an original base station (e.g., BS 1155) to a new base station (e.g., BS 1150) as mobile terminal 1102 roams within the subnet. After the 'start" step of processing block 1505, the first-tier device determines, via decision block 1510, if there is a request from the mobile terminal (MT) to utilize the first-tier device for direct communications. If not, the first-tier device continues to monitor for a MT request. If so, the decisions block 1515 is entered to determine if the first-tier device will/can accept the MT for direct communication—it may not accept the MT due, for instance, to capacity limitations. If this MT cannot be accepted, processing stops via block 1520. If the MT is accepted, the next step in the processing is evidenced by decision block 1525 wherein the first-tier device awaits an active packet (AP) from the mobile terminal. Once the AP is received, an acknowledgement (ACK) is returned to the mobile terminal via processing invoked by block 1530. The AP conveys the time stamp as originated by the MT, and decision block 1535 determines if the time stamp is the same as the time stamp already stored in the Forwarding Table of the first-tier device. If the time stamp is the same (e.g., as determined by the program conveyed in the AP by program part 1210 of FIG. 12 with data contained in data part 1220), the AP undergoes no further processing, as evidenced by "destroy" processing block 1540, and the processing by the first-tier device ends in block 1520.

If the time stamp is to be updated, then the processing path commencing with processing block 1545 is entered. The time stamp is updated in the Forwarding Table (FT), along with the Forwarding Address (i.e., MAC address), in processing block 1550. Next, the AP is duplicated and sent to all adjacent nodes (second-tier devices) that are directly connected to the first-tier device (e.g., BSC 1140 of FIGS. 11A–D); here the term "node" is a generic term referring devices such as a base station (BS), a base station controller (BSC), or a router (R). Since a first-tier device stores network connectivity information, the first-tier device awaits an acknowledgement (ACK) from each second-tier device, as evidenced by decision block 1560. If not all ACKs are received, a re-transmission is sent to the second-tier devices not responding via block 1565. Once all ACKs are received, processing by the first-tier device stops via block 1570.

Flow Diagram of Processing by a Second-Tier Device

Figure 16:
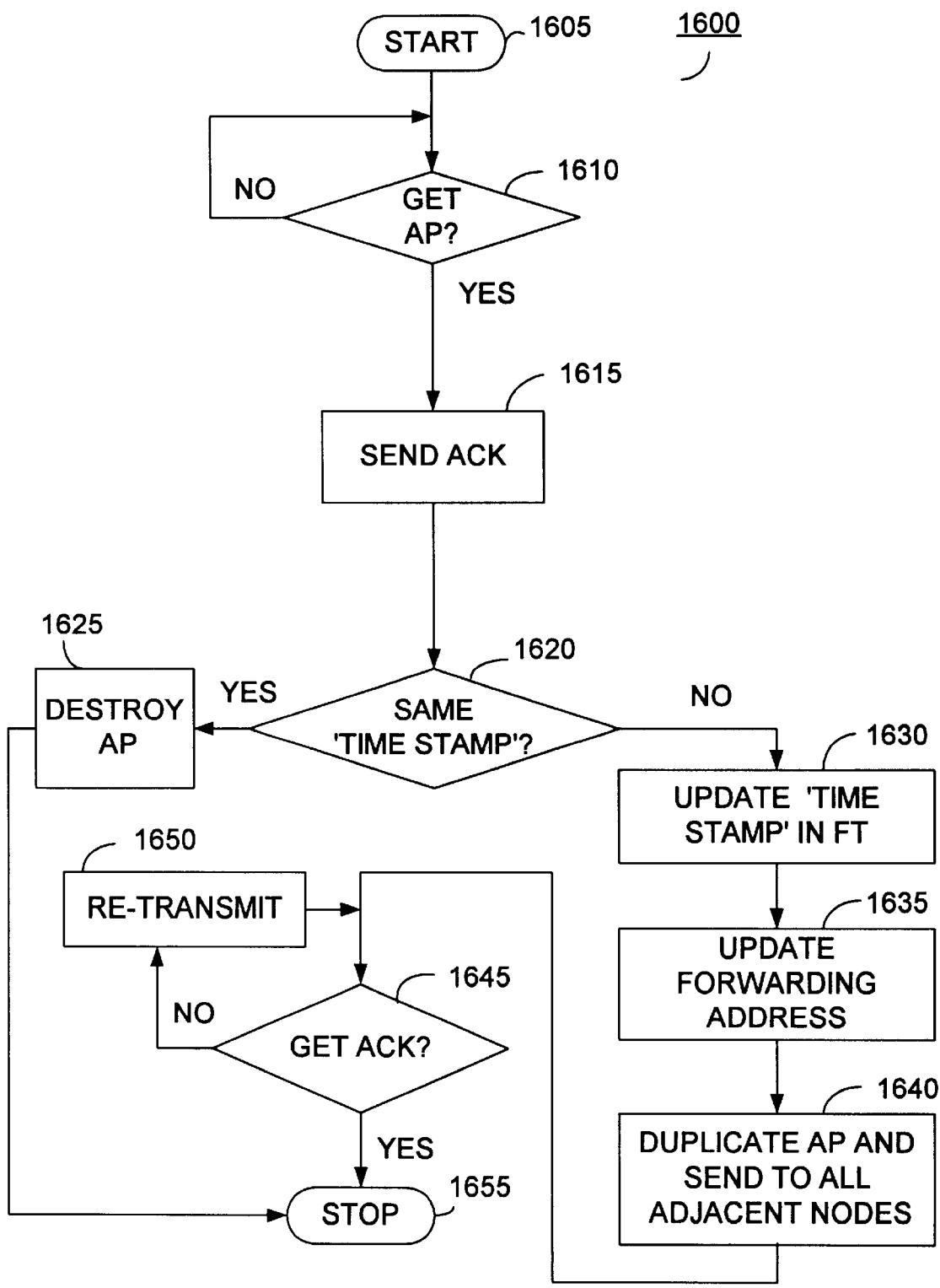
FIG. 16 is a flow diagram of the processes carried out by a "second tier" node.

Flow diagram 1600 of FIG. 16 illustrates the processing performed by a second-tier device, such as BSC 1140 of FIGS. 11A–D, to determine if communications should be re-directed as result of mobile terminal 1102 roaming within the subnet. The processing effected by flow diagram 1600 is a reduced version of that effected by flow diagram 1500 in that there is no "acceptance" phase of the processing, as evidenced by processing blocks 1510 and 1515 of FIG. 15. Accordingly, after the 'start" step of processing block 1605, the next step in the processing is evidenced by decision block 1610 wherein the second-tier device awaits an active packet (AP) from its associated nodes. Once the AP is received, an acknowledgement (ACK) is returned to the mobile terminal via processing invoked by block 1615. The AP conveys the time stamp as originated by the MT requesting a change of base station, and decision block 1620 determines if the time stamp is the same as the time stamp already stored in the Forwarding Table of the second-tier device. If the time stamp is the same (e.g., as determined by the program conveyed in the AP by program part 1210 of FIG. 12 with data contained in data part 1220), the AP undergoes no further processing, as evidenced by "destroy" processing block 1625, and the processing by the second-tier device ends in block 1655.

If the time stamp is to be updated, then the processing path commencing with processing block 1630 is entered. The time stamp is updated in the Forwarding Table (FT), along with the Forwarding Address (i.e., MAC address), in processing block 1635. Next, the AP is duplicated and sent to all adjacent nodes (other second-tier devices) that are directly connected to the second-tier device (e.g., router 1130 of FIGS. 11A–D). Since a second-tier device stores network connectivity information, the second-tier device awaits an acknowledgement (ACK) from each of the other second-tier devices, as evidenced by decision block 1645. If not all ACKs are received, a re-transmission is sent to the other second-tier devices not responding via block 1650. Once all ACKs are received, processing by the second-tier device stops via block 1655.

3. Combined Signaling and Mobility Aspects of the Present Invention, Including an Illustrative Embodiment Since R.323 is running on top of the transport layer (UDP or TCP), and as alluded to above, the issue of mobility is typically addressed by lower layer protocols. For example, Mobile IP in the network layer can hide the change of IP address and route IP packets to the new location of mobile stations. Similarly, other protocols in transport layer can take care of the mobility issues so the signaling protocol does not need to handle the moving of stations. The two key points are that (1) the mobility protocol should react fast enough to reflect the new location of mobile terminals for real-time services, (2) if the moving of mobile terminal (MT) involves a new gatekeeper (GK), the MT needs to register with the new GK, and the new GK needs to channel or "tunnel" messages from the MT to old GK. With respect to point (1), there are known protocols to deal with fast intra-domain handoff, or handoff within a subnet, for example, the technique described in Section 2. The focus of the discussion in accordance with the present invention treats point (2), in which the new GK needs to interact with old GK To reiterate by way of emphasis, there is a clear dichotomy between the operation of the signaling aspect and the operation of the mobility aspect of the present invention: Signaling is effected at the H.323 level (or in terms of the ISO OSI layer model, at a layer above the "transport" layer). On the other hand, mobility is handled at the "network" layer or the "link" layer, and this handling of mobility is generally transparent to the signaling operation. However, for the case in which a mobile terminal is moving at the same time signaling is occurring, it is necessary to insure consistency in operation between the layer handling signaling and the layer(s) handling mobility.

Figure 17:
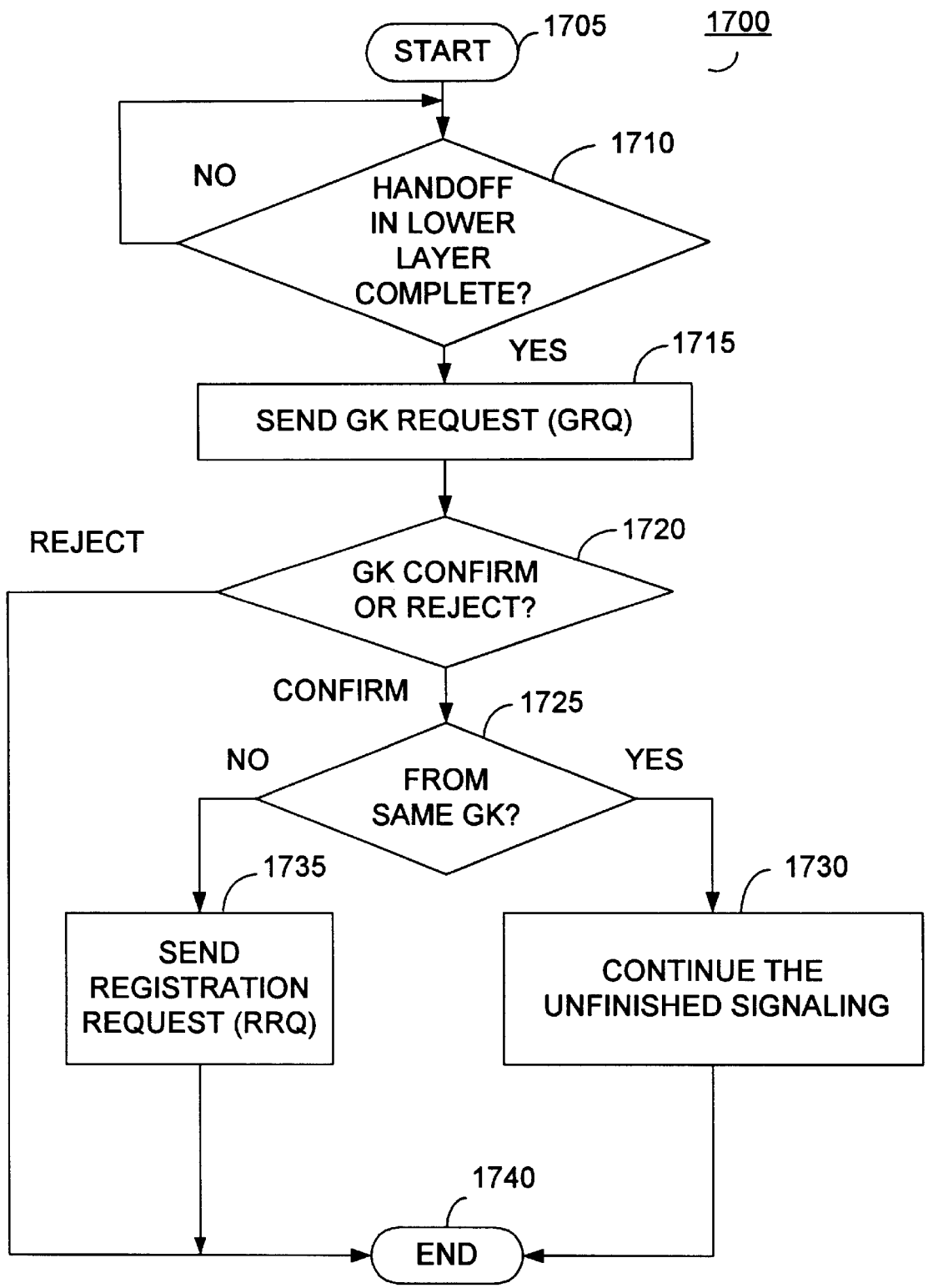
FIG. 17 is a flow diagram for a mobile terminal to handle combined signaling and mobility.

To this end, consider flow diagram 1700 of FIG. 17 which depicts the operational steps carried out by an MT as it moves between subnets. First, recall in the illustrative embodiment for signaling alone, it was presumed for concreteness that each GK had "base station" functionality. For mobility alone, the discussion was couched in terms of base stations and base station controllers rather than gatekeepers. For the discussion of the present section, signaling and mobility principles may be unified since it is readily visualized that more than one BS may now home on a single GK, that is, the GK now has "base station controller" functionality; the agent processes are still carried out in the GK Accordingly, two MT migration situations are possible, namely, (a) the MT moves from an old BS to a new BS served by the original GK; or (b) the MT moves from an old BS served by an old GK to a new BS served by a new GK This terminology is used in the description below.

Figure 18:
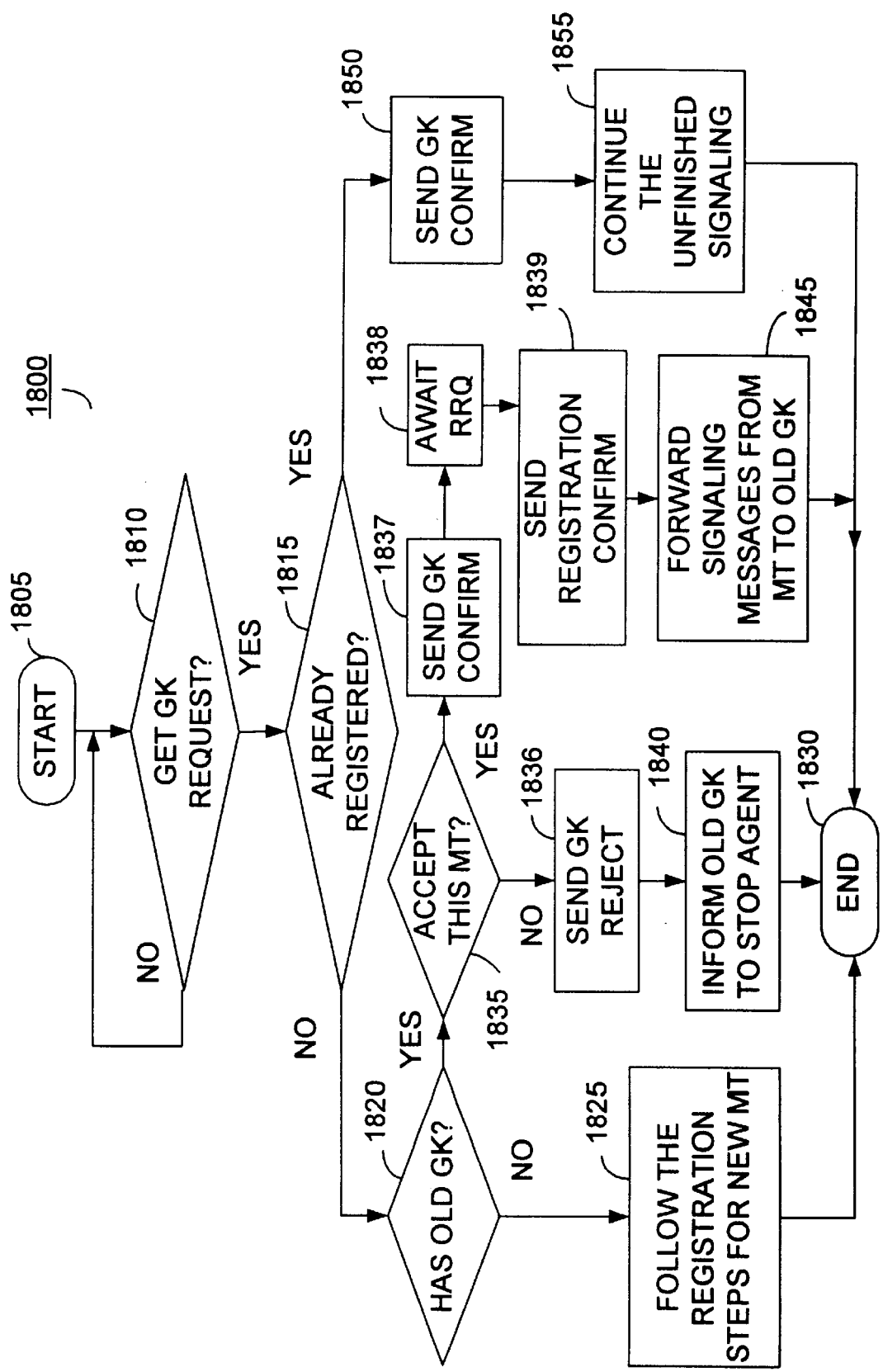
FIG. 18 is a flow diagram for a base station to handle combined signaling and mobility.

With reference to flow diagram 1700, upon "startup" depicted by block 1705, the MT first determines if mobility "handoff" is complete via decision block 1710, that is, the MT determines if it has completed its migration from an old BS to a new BS. If not, the MT awaits completion of handoff. If migration is completed, then the MT sends a GK request (GRQ) associated with the BS upon which the MT now homes, as evidence by processing block 1715—this could be either the old GK or a new GK whereby the MT sends a GRQ to the GK associated with the new BS; in this GRQ, the MT indicates the identifier of the old GK in the nonStandardData field of the GRQ (Appendix D lists the GRQ format). The GK issues either a GK confirm or a GK reject to the MT, which the MT detects via decision block 1720. If the GK accepts the request, then it must be determined if this is the old GK or if a new GK is involved in the process, as per decision block 1725; this is accomplished via a GK identifier passed as part of the "GK confirm" data. If the MT homes on the old or "same" GK, then signaling may continue uninterrupted, as depicted by processing block 1730. On the other hand, if the MT now homes on a new GK, then processing block 1735 is invoked to have the MT send a registration request (RRQ) to register with the new GK To complete the description of combined signaling and mobility, reference is now made to flow diagram 1800 of FIG. 18, which depicts the operational steps carried out by a GK when communicating with the roving MT. Upon "startup" per block 1805, the GK monitors for a GK request as per decision block 1810. Since the MT sends the GK identifier in the GRQ request, once a request is received, it is possible via decision block 1815 to determine whether or not the MT is already registered with this GK If the GK of new BS is same as the GK of old BS (i.e. the MT has already registered with the GK), there is nothing further to be done because the agent represents the MT is still in the same GK The GK just issues GK confirmation via processing block 1850 to the MT, and the unfinished signaling continues via processing block 1855.

However, if the GK of new BS is not same as the GK of old BS, then decision block 1820 is entered. This block is necessary for completeness, from the point of view of a GK, to handle a MT that is newly turned-on—if a new MT is energized, then the registration process for the new MT must be completed via processing block 1825. For the MT that is on and migrating, as is the presumed case for the on-going description, the new GK determines if it will accept the MT associated with the new BS, as per processing block of 1835 (e.g., for network loading purposes, the GK may decide to reject the MT). If rejected, a GK Reject (GRJ) must be sent to the Mr (processing block 1836) and then the old GK must be informed, via processing block 1840, to stop the "agent" that is carrying out the signaling process. If the MT is accepted, then the following sequence of processing takes place: processing block 1837 sends a GK confirm; processing block 1838 awaits a registration request (RRQ) from the MT; processing block 1839 sends a registration confirmation to the MT; and the MT continues the signaling with new GK and the new GK forwards the signaling message to old GK, as depicted by block 1845. The old GK continues its signaling with the instantiated agent. The signaling messages sent by the old GK are routed to the new location of the MT because of the lower layer handling of mobility. Implicit in the foregoing discussion is the case that if the new BS homes on the old GK, the signaling messages sent by the MT will be routed to the old GK—also because the lower layer protocol(s) takes care of the mobility issue.

Although various embodiments which incorporate the teachings of the present invention have been shown and described in detail herein, those skilled in the art can readily devise many other varied embodiments that still incorporate these teachings.

APPENDIX A

| | RAS Message Abbreviations |
|---|---|
| ACF | Admissions Confirm |
| ARJ | Admissions Reject |
| ARQ | Admissions Request |
| BCF | Bandwidth Confirm |
| BRJ | Bandwidth Reject |
| BRQ | Bandwidth Request |
| DCF | Disengage Confirm |
| DRJ | Disengage Reject |
| DRQ | Disengage Request |
| GCF | Gatekeeper Confirm |
| GRJ | Gatekeeper Reject |
| GRQ | Gatekeeper Request |
| IACK | Information request Acknowledgement |
| INAK | Information request Negative Acknowledgement |
| IRQ | Information Request |
| IRR | Information Request Response |
| LCF | Location Confirm |
| LRJ | Location Reject |
| LRQ | Location Request |
| RAC | Resource Availability Confirmation |
| RAI | Resource Availability Indication |
| RCF | Registration Confirm |
| RIP | Request In Progress |
| RRJ | Registration Reject |
| RRQ | Registration Request |
| UCF | Unregistration Confirm |
| URJ | Unregistration Reject |
| URQ | Unregistration Request |

APPENDIX B

Admission Request (ARQ)

The ARQ message includes the following:

requestSeqNum—This is a monotonically increasing number unique to the sender. It shall be returned by the receiver in any messages associated with this specific message.

callType—Using this value, gatekeeper can attempt to determine "real" bandwidth usage. The default value is point-ToPoint for all calls. It should be recognized that the call type may change dynamically during the call and that the final call type may not be known when the ARQ is sent.

callModel—If direct, the endpoint is requesting the direct terminal to terminal call model. If gatekeeperRouted, the endpoint is requesting the gatekeeper mediated model. The gatekeeper is not required to comply with this request.

endpointIdentifier—This is an endpoint identifier that was assigned to the terminal by RCF.

destinationInfo—Sequence of alias addresses for the destination, such as E.164 addresses or H323_IDs. When sending the ARQ to answer a call, destinationInfo indicates the destination of the call (the answering endpoint).

destCallSignalAddress—Transport address used at the destination for call signalling.

destExtraCallInfo—Contains external addresses for multiple calls.

srcInfo—Sequence of alias addresses for the source endpoint, such as E.164 addresses or H323_IDs. When sending the ARQ to answer a call, srcInfo indicates the originator of the call.

srcCallSignalAddress—Transport address used at the source for call signalling.

bandwidth—The number of 100 bits requested for the bidirectional call. For example, a 128 kbit/s call would be signalled as a request for 256 kbit/s. The value refers only to the audio and video bit rate excluding headers and overhead.

callReferenceValue—The CRV from Q.931 for this call; only local validity. This is used by a gatekeeper to associate the ARQ with a particular call.

nonStandardData—Carries information not defined in this Recommendation (for example, proprietary data).

callServices—Provides information on support of optional Q-series protocols to gatekeeper and called terminal.

conferenceID—Unique conference identifier.

activeMC—If TRUE, the calling party has an active MC; otherwise FALSE.

answerCall—Used to indicate to a gatekeeper that a call is incoming.

canMapAlias—If set to TRUE indicates that if the resulting ACF contains destinationInfo, destExtraCallInfo and/or remoteExtension fields, the endpoint can copy this information to the destinationAddress, destExtraCallInfo and remoteExtensionAddress fields of the SETUP message respectively. If the GK would replace addressing information from the ARQ and canMapAlias is FALSE, then the gatekeeper should reject the ARQ.

callIdentifier—A globally unique call identifier set by the originating endpoint which can be used to associate RAS signalling with the modified Q.931 signalling used in this Recommendation. srcAlternatives—A sequence of prioritized source endpoint alternatives for srcInfo, srcCallSignalAddress, or rasAddress. destAlternatives—A sequence of prioritized destination endpoint alternatives for destinationInfo or destCallSignalAddress.

gatekeeperIdentifier—A gatekeeperIdentifier which the client received in the alternateGatekeeper list in RCF from the gatekeeper when it registered or in a previous ARJ message. Used as a backup if the original gatekeeper did not respond or rejected the request.

tokens—This is some data which may be required to allow the operation. The data shall be inserted into the message if available.

cryptoTokens—Encrypted tokens.

integrityCheckValue—Provides improved message integrity/message authentication of the RAS messages. The cryptographically based integrity check value is computed by the sender applying a negotiated integrity algorithm and the secret key upon the entire message. Prior to integrityCheckValue computation, this field shall be ignored and shall be empty. After computation, the sender puts the computed integrity check value in the integrityCheckValue field and transmits the message.

transportQOS—An endpoint may use this to indicate its capability to reserve transport resources.

willSupplyUUIEs—If set to TRUE, this indicates that the endpoint will supply Q.931 message information in IRR messages if requested by the gatekeeper.

The TransportQOS structure includes the following:

endpointControlled—The endpoint will apply its own reservation mechanism.

gatekeeperControlled—The gatekeeper will perform resource reservation on behalf of the endpoint.

noControl—No resource reservation is needed.

NOTE—Both destinationInfo and destCallSignalAddress are not required, but at least one shall be present unless the endpoint is answering a call. There is no absolute rule over which is preferred as this may be site specific, but the E.164 address should be provided if available. It is cautioned that the best results will be obtained by considering the nature of the transport protocols in use.

APPENDIX C

Admission Request (ARQ) in ASN.1

AdmissionRequest ::= SEQUENCE --(ARQ)
{
| | |
|---|---|
| requestSeqNum | RequestSeqNum, |
| callType | CallType, |
| callModel | CallModel OPTIONAL, |
| endpointIdentifier | EndpointIdentifier, |
| destinationInfo | SEQUENCE OF AliasAddress OPTIONAL, |
| destCallSignalAddress | TransportAddress OPTIONAL, |
| destExtraCallInfo | SEQUENCE OF AliasAddress OPTIONAL, |
| srcInfo | SEQUENCE OF AliasAddress, |
| srcCallSignalAddress | TransportAddress OPTIONAL, |
| bandWidth | BandWidth, |
| callReferenceValue | CallReferenceValue, |
| nonStandardData | NonStandardParameter OPTIONAL, |
| callServices | QseriesOptions OPTIONAL, |
| conferenceID | ConferenceIdentifier, |
| activeMC | BOOLEAN, |
| answerCall | BOOLEAN, -- answering a call |
| ..., | |
| canMapAlias | BOOLEAN, -- can handle alias address |
| callIdentifier | CallIdentifier, |
| srcAlternatives | SEQUENCE OF Endpoint OPTIONAL, |
| destAlternatives | SEQUENCE OF Endpoint OPTIONAL, |
| gatekeeperIdentifier | GatekeeperIdentifier OPTIONAL, |
| tokens | SEQUENCE OF ClearToken OPTIONAL, |
| cryptoTokens | SEQUENCE OF CryptoH323Token OPTIONAL, |
| integrityCheckValue | ICV OPTIONAL, |
| transportQOS | TransportQOS OPTIONAL, |
| willSupplyUUIEs | BOOLEAN |
}

APPENDIX D

GatekeeperRequest (GRQ)

Note that one GRQ is sent per logical endpoint; thus an MCU or a Gateway might send many.

The GRQ message includes the following:

requestSeqNum—This is a monotonically increasing number unique to the sender. It shall be returned by the receiver in any messages associated with this specific message.

protocolIdentifier—Identifies the H.225.0 vintage of the sending endpoint.

nonStandardData—Carries information not defined in this Recommendation (for example, proprietary data).

rasAddress—This is the transport address that this endpoint uses for registration and status messages.

endpointType—This specifies the type(s) of the endpoint that is registering (the MC bit shall not be set by itself).

gatekeeperIdentifier—String to identify the gatekeeper from which the terminal would like to receive permission to register. A missing or null string gatekeeperIdentifier indicates that the terminal is interested in any available gatekeeper.

callServices—Provides information on support of optional Q-series protocols to gatekeeper and called terminal.

endpointAlias—A list of alias addresses, by which other terminals may identify this terminal.

alternateEndpoints—A sequence of prioritized endpoint alternatives for rasAddress, endpointType, or endpointAlias.

tokens—This is some data which may be required to allow the operation. The data shall be inserted into the message if available.

cryptoTokens—Encrypted tokens.

authenticationCapability—This indicates the authentication mechanisms supported by the endpoint.

algorithmOIDs— integrity—Indicates to the recipient which integrity mechanism is to be applied on the RAS messages.

integrityCheckValue—Provides improved message integrity/message authentication of the RAS messages. The cryptographically based integrity check value is computed by the sender applying a negotiated integrity algorithm and the secret key upon the entire message. Prior to integrityCheckValue computation, this field shall be ignored and shall be empty. After computation, the sender puts the computed integrity check value in the integrityCheckValue field and transmits the message.

What is claimed is:

1. A method for managing the mobility of a wireless mobile terminal in a subnet of a network, the mobile terminal directly communicating with a first base station within the subnet, the method comprising the steps of locating a second base station to directly communicate with the mobile terminal in place of the first base station, transmitting an active packet from the mobile terminal to the second base station, wherein the active packet conveys a network-layer address of the mobile terminal, a link-layer address of the mobile terminal, and a time-stamp indicative of the time of origination of the active packet, and executing a mobility process in the subnet in response to the active packet, the step of executing including the steps of configuring the second base station with a forwarding table for storing a mobile terminal network-layer address entry, a corresponding link-layer address entry, and a corresponding time stamp entry, comparing the time stamp conveyed by the active packet with the time stamp entry in the forwarding table to determine if there is a time difference, and entering the link-layer address and the time stamp conveyed by the active packet into the forwarding table only if there is a time difference.

2. A method for managing the mobility of a wireless mobile terminal in a subnet of a network, the mobile terminal directly communicating with a first base station within the subnet and the subnet containing a node directly coupled to the first base station, the method comprising the steps of locating a second base station to directly communicate with the mobile terminal in place of the first base station, transmitting an active packet from the mobile terminal to the second base station, and executing a mobility process in the subnet in response to the active packet, the step of executing including the steps of sending a second active packet to the first base station from the node as a step in the mobility process, the second active packet conveying a network-layer address of the mobile terminal, a link-layer address of the node, and a time stamp indicative of the time of origination of the active packet sent to the second base station from the mobile terminal, configuring the first base station with a forwarding table for storing a mobile terminal network-layer address entry, a corresponding link-layer address entry, and a corresponding time stamp entry, comparing the time stamp conveyed by the second packet with the time stamp entry in the forwarding table to determine if there is a time difference, and entering the link-layer address and the time stamp conveyed by the second packet into the forwarding table only if there is a time difference.

3. A method for managing the mobility of a wireless mobile terminal in a subnet of a packet network, the mobile terminal directly communicating a first gatekeeper functioning as a first base station within the subnet, the method comprising the steps of scanning the subnet using an algorithm carried out at a physical layer for a second gatekeeper functioning as a second base station to directly communicate with the mobile terminal in place of the first gatekeeper, transmitting an active packet from the mobile terminal to the second gatekeeper, wherein the active packet conveys a network-layer address of the mobile terminal, a link-layer address of the mobile terminal, and a time-stamp indicative of the time of origination of the active packet, and executing a mobility process in the first and second gatekeepers in response to the active packet, the step of executing including the steps of configuring the first base station with a forwarding table for storing a mobile terminal network-layer address entry, a corresponding link-layer address entry, and a corresponding time stamp entry, configuring the second gatekeeper with a forwarding table for storing a mobile terminal network-layer address entry, a corresponding link-layer address entry, and a corresponding time stamp entry, comparing the time stamp entry conveyed by the active packet with the time stamp entry in the forwarding table to determine if there is a time difference, and entering the link-layer address and the time stamp conveyed by the active packet into the forwarding table only if there is a time difference.

4. A method for managing the mobility of a wireless mobile terminal in a subnet of a packet network, the mobile terminal directly communicating with a first gatekeeper functioning as a first base station within the subnet and wherein the subnet contains a node directly coupled to the first gatekeeper, the method comprising the steps of scanning the subnet using an algorithm carried out at a physical layer for a second gatekeeper functioning as a second base station to directly communicate with the mobile terminal in place of the first gatekeeper, transmitting an active packet from the mobile terminal to the second gatekeeper, and executing a mobility process in the first and second gatekeepers in response to the active packet, the step of executing including the steps of sending a second active packet to the first gatekeeper from the node as a step in the mobility process, the second active packet conveying a network-layer address of the mobile terminal, a link-layer address of the node, and a time stamp indicative of the time of origination of the active packet sent to the second gatekeeper from the mobile terminal, configuring the first gatekeeper with a forwarding table for storing a mobile terminal network-layer address entry, a corresponding link-layer address entry, and a corresponding time stamp entry, comparing the time stamp conveyed by the second packet with the time stamp in the forwarding table to determine if there is a time difference, and entering the link-layer address entry and the time stamp conveyed by the second active packet into the forwarding table only if there is a time difference.

5. A method for managing the mobility of a wireless mobile terminal, in a subnet of a packet network using the medium access control (MAC) layer, the mobile terminal directly communicating with a first base station within the subnet, the method comprising the steps of scanning the subnet for a second base station at a physical layer to directly communicate with the mobile terminal in place of the first base station, transmitting an active packet from the mobile terminal to the second base station, the active packet including a MAC address of the mobile terminal and the active packet also conveys an IP address of the mobile terminal and a time stamp indicative of the time of origination of the active packet, and executing a mobility process in the base stations of the subnet with reference to the MAC address in the active packet, the step of executing including the steps of configuring the second base station with a forwarding table for storing a forwarding MAC address entry and a time stamp entry corresponding to the IP address, comparing the time stamp conveyed by the active packet with the time stamp entry in the forwarding table to determine if there is a time stamp difference, and entering the MAC address into the forwarding MAC address entry and the time stamp conveyed by the active packet into the time stamp entry only if there is a time difference.

* * * * *